United States Patent [19]
Chung et al.

[11] Patent Number: 5,167,848
[45] Date of Patent: Dec. 1, 1992

[54] GRAFTED VISCOSITY INDEX IMPROVER

[75] Inventors: David Y. Chung, Edison; Mark J. Struglinski, Bridgewater; John E. Johnston, Westfield, all of N.J.

[73] Assignee: Exxon Chemical Patents Inc., Linden, N.J.

[21] Appl. No.: 358,777

[22] Filed: May 30, 1989

[51] Int. Cl.$^5$ ............... C10M 149/18; C10M 145/22
[52] U.S. Cl. .................. 252/51.5 A; 252/45; 252/50; 252/52 R; 525/64; 525/66; 525/285; 525/291; 525/298; 525/300; 525/301; 525/303; 525/327.6; 525/327.7; 525/329.5; 525/329.6; 525/329.9; 525/330.1
[58] Field of Search ............ 252/56 D, 56 R, 51.5 A, 252/51.5 R, 45, 50, 52 R, 64, 66, 301, 200, 303, 291, 298, 327.7, 327.6, 329.5, 329.9, 330.1

[56] References Cited

U.S. PATENT DOCUMENTS

| | | | |
|---|---|---|---|
| 3,316,177 | 4/1967 | Dorer | 252/51.5 |
| 3,326,804 | 6/1967 | Shih-en Hu | 252/34 |
| 3,687,849 | 8/1972 | Abbott | 252/47.5 |
| 4,089,794 | 5/1978 | Engel et al. | 252/51.5 A |
| 4,132,661 | 1/1979 | Waldbillig et al. | 252/51.5 A |
| 4,137,185 | 1/1979 | Gardiner et al. | 252/33 |
| 4,144,181 | 3/1979 | Elliott et al. | 252/33.4 |
| 4,146,489 | 3/1979 | Stambaugh et al. | 44/62 |
| 4,160,739 | 7/1979 | Stambaugh et al. | 252/34 |
| 4,169,063 | 9/1979 | Kiovsky | 252/51.5 A |
| 4,171,273 | 10/1979 | Waldbillig et al. | 252/51.5 A |
| 4,219,432 | 8/1980 | Girgenti et al. | 252/51.5 A |
| 4,320,019 | 3/1982 | Hayashi | 252/51.5 A |
| 4,505,834 | 3/1985 | Papay et al. | 252/51.5 A |
| 4,516,104 | 5/1985 | McDermott | 336/206 |
| 4,517,104 | 5/1985 | Bloch et al. | 252/51.5 A |
| 4,540,753 | 9/1985 | Cozewith et al. | 526/88 |
| 4,557,847 | 12/1985 | Gutierrez et al. | 252/56 D |
| 4,632,769 | 12/1986 | Gutierrez et al. | 252/51.5 A |
| 4,707,285 | 11/1987 | Brewster et al. | 252/50 |
| 4,764,304 | 8/1988 | Kapuscinski et al. | 252/51.5 |
| 4,780,228 | 10/1988 | Gardiner et al. | 252/56 R |
| 4,803,003 | 2/1989 | Chung | 252/56 D |
| 4,804,794 | 2/1989 | Ver Strate et al. | 585/12 |

FOREIGN PATENT DOCUMENTS

| | | |
|---|---|---|
| 0201164 | 10/1986 | European Pat. Off. . |
| 0256547 | 8/1987 | European Pat. Off. . |
| 785496 | 9/1978 | South Africa . |
| 1578049 | 10/1980 | United Kingdom . |
| 20-55852A | 3/1981 | United Kingdom . |

Primary Examiner—Margaret Medley
Attorney, Agent, or Firm—M. B. Kapustij; R. A. Negin

[57] ABSTRACT

Oil soluble grafted ethylene-alpha-olefin copolymer useful as a viscosity modifier for oleaginous compositions comprising:

(i) backbone copolymer of ethylene and at least one other alpha-olefin monomer, said copolymer comprising intramolecularly heterogeneous copolymer chains containing at least one crystallizable segment of methylene units and at least one low crysallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_w/\overline{M}_v$ of less than 1.8, and wherein at least two portions of an individual intramolecularly heterogeneous chain, each portion comprising at least 5 weight percent of said chain, differ in composition from one another by at least 7 weight percent ethylene; having grafted on said backbone copolymer (ii) residue of ethylenically unsaturated grafting material;

said grafted ethylenealpha-olefin copolymer having substantially the molecular weight distribution, i.e., within about 10 percent, of said copolymer of ethylene. The preferred grafting material is an ethylenically monounsaturated carboxylic acid material having 1 to 2 carboxylic acid groups or an anhydride group.

101 Claims, No Drawings

GRAFTED VISCOSITY INDEX IMPROVER

BACKGROUND OF THE INVENTION

The present invention relates to grafted ethylene copolymers useful as viscosity index (V.I.) improver additives for oleaginous compositions, particularly fuel oils and lubricating oils, methods for preparing said grafted ethylene copolymers, and to oleaginous compositions containing these grafted copolymers. More specifically the instant invention relates to a copolymer of ethylene with other alpha-olefins as a backbone, said copolymer comprised of segmented copolymer chains with compositions which are intramolecularly heterogeneous and intermolecularly homogeneous, having grafted thereto the residue of ethylenically unsaturated grafting material. The additives of the instant invention exhibit improved mechanical properties and provide oleaginous compositions, particularly lubricating oil compositions, exhibiting improved low temperature viscometric properties compared to conventional grafted ethylene and alpha-olefin copolymers. Furthermore, certain of these grafted ethylene copolymers, particularly those wherein the grafting material contains a nitrogeneous moiety, function both as V.I. improvers and dispersants in oleaginous compositions.

The concept of derivatizing V.I. improving high molecular weight ethylene and alpha-olefin copolymers with acid moieties such as maleic anhydride, followed by reaction with an amine and a carboxylic acid component to form a V.I.-dispersant oil additive is known in the art and is disclosed, inter alia, by the following patents:

U.S. Pat. No. 3,316,177 teaches ethylene copolymers such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxidized polymer, which is grafted with maleic anhydride followed by reaction with polyalkylene polyamines.

U.S. Pat. No. 4,089,794 teaches grafting the ethylene copolymer with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ mono carboxylic acid anhydrides, and dicarboxylic anhydrides, such as acetic anhydride, succinic anhydride, etc. with an ethylene copolymer reacted with maleic anhydride and a polyalkylene polyamine to inhibit cross linking and viscosity increase due to further reaction of any primary amine groups which were initially unreacted.

U.S. Pat. No. 4,144,181 is similar to U.S. Pat. No. 4,137,185 in that it teaches using a sulfonic acid to inactivate the remaining primary amine groups when a maleic anhydride grafted ethylene-propylene copolymer is reacted with a polyamine.

U.S. Pat. No. 4,169,063 reacts an ethylene copolymer in the absence of oxygen and chlorine at temperatures of 150° to 250° C. with maleic anhydride followed by reaction with polyamine.

A number of prior disclosures teach avoiding the use of polyamine having two primary amine groups to thereby reduce cross-linking problems which become more of a problem as the number of amine moieties added to the polymer molecule is increased in order to increase dispersancy.

German Published Application No. P3025274.5 teaches an ethylene copolymer reacted with maleic anhydride in oil using a long chain alkyl hetero or oxygen containing amine.

U.S. Pat. No. 4,132,661 grafts ethylene copolymer, using peroxide and/or air blowing, with maleic anhydride and then reacts with primary-tertiary diamine.

U.S. Pat. No. 4,160,739 teaches an ethylene copolymer which is grafted, using a free radical technique, with alternating maleic anhydride and a second polymerizable monomer such as methacrylic acid, which materials are reacted with an amine having a single primary, or a single secondary, amine group.

U.S. Pat. No. 4,171,273 reacts an ethylene copolymer with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

U.S. Pat. No. 4,219,432 teaches maleic anhydride grafted ethylene copolymer reacted with a mixture of an amine having only one primary group together with a second amine having two or more primary groups.

German published application No. 2753569.9 shows an ethylene copolymer reacted with maleic anhydride by a free-radical technique and then reacted with an amine having a single primary group.

German published application No. 2845288 grafts maleic anhydride on an ethylene-propylene copolymer by thermal grafting at high temperatures and then reacts with amine having one primary group.

French published application No. 2423530 grafts maleic anhydride on an ethylene-propylene copolymer with maleic anhydride at 150 to 210.C followed by reaction with an amine having one primary or secondary group.

The early patents such as U.S. Pat. Nos. 3,316,177 and 3,326,804 taught the general concept of grafting an ethylene-propylene copolymer with maleic anhydride and then reacting with a polyalkylene polyamine such as polyethylene amines. Subsequently, U.S. Pat. No. 4,089,794 was directed to using an oil solution for free radical peroxide grafting the ethylene copolymer with maleic anhydride and then reaction with the polyamine. This concept had the advantage that by using oil, the entire reaction could be carried out in an oil solution to form an oil concentrate, which is the commercial form in which such additives are sold. This was an advantage over using a volatile solvent for the reactions, which has to be subsequently removed and replaced by oil to form a concentrate. Subsequently, in operating at higher polyamine levels in order to further increase the dispersing effect, increased problems occurred with the unreacted amine groups cross-linking and thereby causing viscosity increase of the oil concentrate during storage and subsequent formation of haze and in some instances gelling. Even though one or more moles of the ethylene polyamine was used per mole of maleic anhydride during imide formation, cross-linking became more of a problem as the nitrogen content of the polymers was increased. One solution was to use the polyamines and then to react the remaining primary amino groups with an acid anhydride, preferably acetic anhydride, of U.S. Pat. No. 4,137,185 or the sulfonic acid of U.S. Pat. No. 4,144,181. The cross-linking problem could also be minimized by avoidance of the ethylene polyamines and instead using amines having one primary group which would react with the maleic anhydride while the other amino groups would be tertiary groups which were substantially unreactive. Patents or published applications showing the use of such primary-tertiary amines noted above are U.S. Pat. No. 4,219,432, wherein a part of the polyamine was replaced with a primary-tertiary amine; U.S. Pat. No. 4,132,661; U.S. Pat. No. 4,160,739; U.S. Pat. No. 4,171,273; German No. P2753569.9; German No. 2,845,288; and French No. 2,423,530.

U.S. Pat. No. 4,516,104 and 4,632,769 represented a further improvement over the art in that they permitted the utilization of the generally less expensive polyamines having two primary amine groups, while achieving good dispersancy levels, inhibiting cross-linking and allowing initiator, e.g., peroxide, grafting in oil.

U.S. Pat. No. 4,517,104 discloses polymeric viscosity index (V.I.) improver-dispersant additives for petroleum oils, particularly lubricating oils, comprising a copolymer of ethylene with one or more $C_3$ to $C_{28}$ alpha-olefins, preferably propylene, which have been grafted with acid moieties, e.g., maleic anhydride, preferably using a free radical initiator in a solvent, preferably lubricating oil, and then reacted with a mixture of a carboxylic acid component, preferably an alkyl succinic anhydride, and a polyamine having two or more primary amine groups. Or the grafted polymer may be reacted with said acid component prereacted with said polyamine to form salts, amides, imides, etc. and then reacted with said grafted olefin polymer. These reactions can permit the incorporation of varnish inhibition and dispersancy into the ethylene copolymer while inhibiting cross-linking or gelling.

U.S. Pat. No. 4,632,769 discloses oil soluble viscosity improving ethylene copolymers such as copolymers of ethylene and propylene, reacted or grafted with ethylenically unsaturated carboxylic acid moieties, preferably maleic anhydride moieties, and then reacted with polyamines having two or more primary amine groups and a $C_{22}$ to $C_{28}$ olefin carboxylic acid component, preferably alkylene polyamine and alkenyl succinic anhydride, respectively. These reactions can permit the incorporation of varnish inhibition and dispersancy into the ethylene copolymer while inhibiting cross-linking or gelling.

While the additives disclosed in U.S. Pat. No. 4,517,104 and 4,632,769 provide quite useful oil compositions there is a need for oil compositions which exhibit better low temperature viscometric properties than those possessed by the prior art oil compositions.

The problem of providing V.I. oil additives exhibiting improved low temperature viscometric properties is addressed in U.S. Pat. Nos. 4,540,753 and U.S. Pat. No. 4,804,794, which is incorporated herein by reference, in particular discloses segmented copolymers of ethylene and at least one other alpha-olefin monomer, each copolymer being intramolecularly heterogeneous and intermolecularly homogeneous and at least one segment of the copolymer, constituting at least 10% of the copolymer's chain, being a crystallizable segment. These copolymers are disclosed as exhibiting good mechanical properties such as good shear stability and as being useful V.I. improvers which provide lubricating oils having highly desirable viscosity and pumpability properties at low temperatures. However, these copolymers are disclosed as being V.I. improvers, and there is no disclosure of grafting said copolymers with an ethylenically unsaturated grafting material. Indeed, it was heretofore generally believed that these ethylene copolymers could not be grafted with conventional ethylenically unsaturated grafting materials without deleteriously or adversely affecting, i.e., broadening narrow molecular weight distribution (MWD). It was believed that this deleterious affect upon their narrow MWD would have a concomitant deleterious affect upon their intermolecular homogeneity and upon the advantageous low temperature viscometric properties of these copolymers per se. Indeed, grafting these ethylene copolymers under certain grafting conditions, e.g., high temperature and/or high shear conditions, does adversely affect their narrow MWD and the advantageous low temperature viscometric properties of oleaginous compositions containing said grafted ethylene copolymers as well as their advantageous mechanical properties, e.g., shear stability. However, it has been surprisingly discovered that carrying out grafting of these ethylene copolymers under relatively mild conditions of low temperature and mild shear conditions yields grafted ethylene copolymers which substantially retain the narrow MWD of the ungrafted ethylene copolymers and consequently their improved mechanical properties and their ability to provide oleaginous compositions exhibiting improved low temperature viscometric properties.

SUMMARY OF THE INVENTION

The present invention is directed to oil soluble grafted ethylene copolymers, and to a method for producing these copolymers, useful as V.I. improvers and, with ethylenically unsaturated nitrogeneous grafting materials, as multifunctional viscosity index improvers or modifiers, e.g., as V.I. improver-dispersants, in oleaginous compositions. The grafted copolymers of the instant invention provide oleaginous compositions, in particular lubricating oil compositions, exhibiting improved viscometric properties, particularly highly desirable viscosity properties at low temperatures and, when these copolymers have grafted thereto the residues of ethylenically unsaturated nitrogeneous grafting materials, the added benefit of dispersancy. Furthermore, the instant grafted ethylene copolymers have a narrow MWD and good shear stability.

The copolymers of the instant invention are grafted with an ethylenically unsaturated grafting materials as described hereinafter under grafting conditions, e.g., temperature and shear conditions, effective to yield grafted ethylene copolymers retaining substantially the same advantageous narrow MWD and substantially the other advantageous properties as the ungrafted ethylene copolymers.

The copolymers which are thus grafted are disclosed in U.S. Pat. No. 4,804,794, which is incorporated herein by reference. These copolymers are segmented copolymers of ethylene and at least one other alpha-olefin monomer; each copolymer is intramolecularly heterogeneous and intermolecularly homogeneous and at least one segment of the copolymer, constituting at least 10% of the copolymer's chain, is a crystallizable segment. For the purposes of this application, the term "crystallizable segment" is defined to be each segment of the copolymer chain having a number-average molecular weight of at least 700 wherein the ethylene content is at least 57 wt. %. The remaining segments of the copolymer chain are herein termed the "low crystallinity segments" and are characterized by an average ethylene content of not greater than about 53 wt %. Furthermore, the molecular weight distribution (MWD) of copolymer is very narrow. It is well known that the breadth of the molecular weight distribution can be characterized by the ratios of various molecular weight averages. For example, an indication of a narrow MWD in accordance with the present invention is that the ratio of weight to number-average molecular weight ($\overline{M}_w/\overline{M}_n$) is less than 2. Alternatively, a ratio of the z-average molecular weight to the weight-average molecular weight ($\overline{M}_z/\overline{M}_w$) of less than 1.8 typifies a narrow MWD in accordance with the present invention. It is known that a portion of the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, polymers, in accordance with the present invention, are characterized by having at least one of $\overline{M}_w/\overline{M}_n$ less than 2 and $\overline{M}_z/\overline{M}_w$ less than 1.8. The copolymer comprises chains within which the ratio of the monomers varies along the chain length. To obtain the intramolecular compositional heterogeneity and narrow MWD, the copolymers are preferably made in a tubular reactor.

DETAILED DESCRIPTION OF THE INVENTION

In accordance with the instant invention there are provided polymeric materials useful as V.I.-improvers for oleaginous materials, particularly lubricating oils, which are comprised of (i) certain specific types of ethylene and alpha-olefin copolymers as the backbone, having grafted thereto (ii) grafting material or compound, preferably ethylenically unsaturated grafting material or compound. Additionally, certain of these grafted copolymers, particularly where the grafting material is a nitrogenous material, exhibit dispersant properties.

More particularly, these polymeric materials are comprised of:

(i) backbone copolymer of ethylene and at least one other alpha-olefin monomer, said copolymer comprising intramolecularly heterogeneous and intermolecularly homogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; having grafted thereto (ii) a grafting material or compound, preferably ethylenically unsaturated grafting material or compound.

When the grafted ethylene copolymers of the instant invention are incorporated into oleaginous materials such as lubricating oils the resultant oleaginous compositions exhibit better low temperature viscometric properties than oleaginous composition containing conventional ethylene copolymers. Furthermore, the grafted ethylene copolymers of this invention exhibit better mechanical properties, e.g., better shear stability at a selected thickening efficiency, than either conventional grafted ethylene copolymers or grafted ethylene copolymers derived from the ethylene copolymers of the instant invention wherein the narrow molecular weight distribution of the ethylene copolymer backbone has been broadened above the upper limits described herein during grafting.

Thickening Efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8.° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($M_n$) and is a convenient, useful measurement for formulation of lubricating oils of various grades.

Shear Stability Index (SSI) is indicative of the resistance of a polymer to molecular weight degradation by shearing forces. The higher the SSI the less stable the polymer, i.e., the more prone it is to molecular weight degradation by shear. SSI is determined in accordance with ASTM D3945.

The grafted ethylene copolymers of the instant invention which have been reacted with the polyamines containing at least one tertiary amino group and one primary amino group are useful as multifunctional viscosity index improvers, e.g., viscosity index improver-dispersant additives, for oleaginous compositions. The MFVIs of the instant invention provide oleaginous compositions, particularly lubricating oil compositions, having better low temperature viscometric properties and substantially similar dispersancy characteristics as oleaginous compositions containing conventional MFVIs falling outside the scope of the instant invention.

Ethylene and Alpha-Olefin Copolymer

The ethylene and alpha-olefin copolymers defined as (i) hereinafore are copolymers of ethylene with at least one other alpha-olefin comprised of segmented copolymer chains with compositions which are intramolecularly heterogeneous and intermolecularly hemogeneous.

For convenience, certain terms that are repeated throughout the present specification are defined below:

a. Inter-CD defines the compositional variation, in terms of ethylene content, among polymer chains. It is expressed as the minimum deviation (analogous to a standard deviation) in terms of weight percent ethylene, from the average ethylene composition for a given copolymer sample needed to include a given weight percent of the total copolymer sample, which is obtained by excluding equal weight fractions from both ends of the distribution. The deviation need not be symmetrical.

When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b. Intra-CD is the compositional variation, in terms of ethylene, within a copolymer chain. It is expressed as the minimum difference in weight (wt.%) ethylene that exists between two portions of a single copolymer chain, each portion comprising at least 5 weight % of the chain.

c. Molecular weight distribution (MWD) is a measure of the range of molecular weights within a given copolymer sample. It is characterized in terms of at least one of the ratios of weight-average to number-average molecular weight, $\overline{M}_w/\overline{M}_n$, and z-average to weight-average molecular weight, $\overline{M}_z/\overline{M}_w$ where:

$$M_w = \frac{\Sigma N_i M_i^2}{\Sigma N_i M_i}$$

$$M_n = \frac{\Sigma N_i M_i}{\Sigma N_i}, \text{ and}$$

$$M_z = \frac{\Sigma N_i M_i^3}{\Sigma N_i M_i^2}$$

wherein $N_i$ is the number of molecules of molecular weight $M_i$.

d. Viscosity Index (V.I.) is the ability of a lubricating oil to accommodate increases in temperature with a minimum decrease in viscosity. The greater this ability, the higher the V.I. Viscosity Index is defined by ASTM D2270.

The instant copolymers are segmented copolymers of ethylene and at least one other alpha-olefin monomer wherein the copolymer's chain contains at least one crystallizable segment of ethylene monomer units, as will be more completely described below, and at least one low crystallinity ethylene-alpha-olefin copolymer segment, where in the low crystallinity copolymer segment is characterized in the unoriented bulk state after at least 24 hours annealing by a degree of crystallinity of less than about 0.2% at 23° C., and wherein the copolymer's chain is intramolecularly heterogeneous and intermolecularly homogeneous, and has an MWD characterized by at least one of $M_w/M_n$ of less than 2 and $\overline{M}_z/\overline{M}_w$ of less than 1.8. The crystallizable segments comprise from about 10 to 90 wt. %, preferably from about 20 to 85 wt. %, of the total copolymer chain, and contain an average ethylene content which is at least about 57 wt. %, preferably at least about 62 wt. %, and more preferably at least about 63 wt. % and which is not greater than 95 wt. %, more preferably <85%, and most preferably <75 wt. % (e.g., from about 58 to 68 wt. %). The low crystallinity copolymer segments comprise from about 90 to 10 wt. %, preferably from about 80 to 15 wt. %, and more preferably from about 65 to 35 wt. %, of the total copolymer chain, and contain an average ethylene content of from about 20 to 53 wt. %, preferably from about 30 to 50 wt. %, and more preferably from about 35 to 50 wt. %. The copolymers comprise intramolecularly heterogeneous chain segments wherein at least two portions of an individual intramolecularly heterogeneous chain, each portion comprising at least 5 weight percent of the chain and having a molecular weight of at least 7000 contain at least 5 wt. % ethylene and differ in composition from one another by at least 5 weight percent ethylene, wherein the intermolecular compositional dispersity of the polymer is such that 95 wt. % of the polymer chains have a composition 15% or less different in ethylene from the average weight percent ethylene composition, and wherein the copolymer is characterized by at least one or a ratio of $\overline{M}_w/\overline{M}_n$ of less than 2 and a ratio of $\overline{M}_z/\overline{M}_w$ of less than 1.8.

As described above, the copolymers will contain at least one crystallizable segment rich in methylene units (hereinafter called an "M" segment) and at least one low crystallinity ethylene-alpha-olefin copolymer segment (hereinafter called a "T" segment). The copolymers may be therefore illustrated by copolymers selected from the group consisting of copolymer chain structures having the following segment sequences:

$$M-T, \qquad (I)$$

$$T^1-(M-T^2)x, \text{ and} \qquad (II)$$

$$T^1-(M^1-T^2)y-M^2 \qquad (III)$$

wherein M and T are defined above, $M^1$ and $M^2$ can be the same or different and are each M segments, $T^1$ and $T^2$ can be the same or different and are each T segments, x is an integer of from 1 to 3 and y is an integer of 1 to 3.

In structure II (x=1), the copolymer's M segment is positioned between two T segments, and the M segment can be positioned substantially in the center of the polymer chain (that is, the $T^1$ and $T^2$ segments can be substantially the same molecular weight and the sum of the molecular weight of the $T^1$ and $T^2$ segments can be substantially equal to the molecular weight of the M segment), although this is not essential to the practice of this invention. Preferably, the copolymer will contain only one M segment per chain. Therefore, structures I and II (x=1) are preferred.

Preferably, the M segments and T segments of the copolymer are located along the copolymer chain so that only a limited number of the copolymer chains can associate before the steric problems associated with packing the low crystallinity T segments prevents further agglomeration. Therefore, in a preferred embodiment, the M segment is located near the center of the copolymer chain and only one M segment is in the chain.

As will be shown below, a copolymer of the structure $$M^1-(T-M^2)_z \qquad (IV)$$

(wherein $M^1$, $M^2$ and T are as defined above, and wherein z is an integer of at least 1) are undesirable as viscosity modifier polymers. It has been found that solutions of structure IV copolymers in oil tend to gel even when the M and T portions have exactly the same composition and molecular weight as structure II copolymers (with x=z=1). It is believed this poor viscosity modifier performance is due to the inability of a center T segment to sterically stabilize against association.

The M segments of the copolymers of this invention comprise ethylene and can also comprise at least one other alpha-olefin, e.g., containing 3 to 18 carbon atoms. The T segments comprise ethylene and at least one other alpha-olefin, e.g., alpha-olefins containing 3 to 18 carbon atoms. The M and T segments can also comprise other polymerizable monomers, e.g., non-conjugated dienes or cyclic mono-olefins.

Since the present invention is considered to be most preferred in the context of ethylene-propylene (EPM) copolymers it will be described in detail in the context of EPM.

Copolymer (i)(a) in accordance with the present invention is preferably made in a tubular reactor. When produced in a tubular reactor with monomer feed only at the tube inlet, it is known at the beginning of the tubular reactor, ethylene, due to its high reactivity, will be preferentially polymerized. The concentration of monomers in solution changes along the tube in favor of propylene as the ethylene is depleted. The result, with monomer feed only at the inlet, is copolymer chains which are higher in ethylene concentration in the chain segments grown near the reactor inlet (as defined at the point at which the polymerization reaction commences), and higher in propylene concentration in the chain segments formed near the reactor outlet. These copolymer chains are therefore tapered in composition. An illustrative copolymer chain of ethylene-propylene is schematically presented below with E representing ethylene constituents and P representing propylene constituents in the chain:

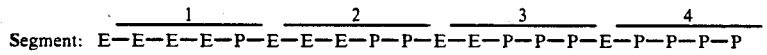

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right with the more reactive ethylene being depleted and the reaction mixture proportionately increasing in propylene concentration, the subsequent chain segments become more concentrated in propylene. The resulting chain is intra-molecularly heterogeneous.

The property, of the copolymer discussed herein, related to intramolecular compositional dispersity (compositional variation within a chain) shall be referred to as Intra-CD, and that related to intermolecular compositional dispersity (compositional variation between chains) shall be referred to as Inter-CD.

For copolymers in accordance with the present invention, composition can vary between chains as well as along the length of the chain. An object of this invention is to minimize the amount of inter-chain variation. The Inter-CD can be characterized by the difference in composition between the copolymer fractions containing the highest and lowest quantity of ethylene. Techniques for measuring the breadth of the Inter-CD are known as illustrated in "Polymerization of ethylene and propylene to amorphous copolymers with catalysts of vanadium oxychloride and alkyl aluminum halides"; E. Junghanns, A. Gumboldt and G. Bier; Makromol. Chem., V. 58 (12/12/62): 18–42, wherein a p-xylene/-dimethylformamide solvent/non-solvent was used to fractionate copolymer into fractions of differing intermolecular composition. Other solvent/non-solvent systems can be used as hexane/2 propanol, as will be discussed in more detail below.

The Inter-CD of copolymer in accordance with the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 wt. %.

Broadly, the Intra-CD of copolymer in accordance with the present invention is such that at least two portions of an individual intramolecularly heterogeneous chain, each portion comprising at least 5 weight percent of the chain, differ in composition from one another by at least 7 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent, as well as, of at least 40 weight percent ethylene are also considered to be in accordance with the present invention.

The experimental procedure for determining Intra-CD is as follows. First the Inter-CD is established as described below, then the polymer chain is broken into fragments along its contour and the Inter-CD of the fragments is determined. The difference in the two results is due to Intra-CD as can be seen in the illustrative example below.

Consider a heterogeneous sample polymer containing 30 monomer units. It consists of 3 molecules designated A, B, C.

A EEEEPEEEPEEEPPEEPPEPPPEPPPPPPP
  B EEEEEPEEEPEEEPPEEEPPPEPPPEEPPP
  C EEPEEEPEEEPEEEPEEEPPEEPPPEEPPP

Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%.

If the chains are broken into fragments, there will be a new Inter-CD. For simplicity, consider first breaking only molecule A into fragments shown by the slashes as follows:

EEEEP/EEEPE/EEPPE/EPPEP/-
    PPEPP/PPPPP

Portions of 72.7%, 72.7%, 50%, 30.8%, 14.3% and 0% ethylene are obtained. If molecules B and C are similarly broken and the weight fractions of similar composition are grouped a new Inter-CD is obtained.

In order to determine the fraction of a polymer which is intramolecularly heterogeneous in a mixture of polymers combined from several sources the mixture must be separated into fractions which show no further heterogenity upon subsequent fractionation. These fractions are subsequently fractured and fractionated to reveal which are heterogeneous.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about 105, fragments of ca 5000 molecular weight are appropriate. A detailed mathematical analysis of plug flow or batch polymerization indicates that the rate of change of composition along the polymer chain contour will be most severe at high ethylene conversion near the end of the polymerization. The shortest fragments are needed here to show the low ethylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p. 341 and in H. Inagaki, T. Tanaku, "*Developments in Polymer Characterization*", 3, 1, (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixtures than propylene-rich chains. Furthermore, for crystalline segments, solubility is significantly reduced. Thus, the high molecular weight, high ethylene chains are easily separated on the basis of thermodynamics.

A fractionation procedure is as follows: Unfragmented polymer is dissolved in n-hexane at 23° C. to form ca a 1% solution (1 g. polymer/100 cc hexane). Isopropyl alcohol is titrated into the solution until turbidity appears at which time the precipitate is allowed to settle. The supernatant liquid is removed and the precipitate is dried by pressing between Mylar ® polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5%–10% by weight of the original polymer, especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. (The time or temperature can be empirically adjusted based on the ethylene content and molecular weight of the polymer.) This should be adequate to reduce a 105 molecular weight polymer to fragments of ca 5000 molecular weight. Such degradation does not substantially change the average ethylene content of the polymer, although propylene tends to be lost on scission in preference to ethylene. This polymer is fractionated by the same procedure as the high molecular weight precursor. Ethylene content is measured, as well as molecular weight on selected fractions.

The procedure to characterize intramolecular heterogeneity is laborious and even when performed at an absolute optimum, does not show how the segments of the chain are connected. In fact it is not possible, with current technology, to determine the polymer structure without recourse to the synthesis conditions. With knowledge of the synthesis conditions, the structure can be defined as follows.

Ethylene, propylene or high alpha-olefin polymerizations with transition metal catalysts can be described by the terminal copolymerization model, to an approximation adequate for the present purpose. (G. Ver Strate, *Encyclopedia of Polymer Science and Engineering*, vol. 6, 522 (1986)). In this model, the relative reactivity of the two monomers is specified by two reactivity ratios defined as follows:

$$R_1 = \frac{\text{(rate constant for ethylene adding to ethylene)}}{\text{(rate constant for propylene adding to ethylene)}}$$

$$R_2 = \frac{\text{(rate constant for propylene adding to propylene)}}{\text{(rate constant for ethylene adding to propylene)}}$$

Given these two constants, at a given temperature, the ratio of the molar amount of ethylene, E, to the molar amount of propylene, P, entering the chain from a solution containing ethylene and propylene at molar concentrations [E] and [P] respectively is $$\frac{E}{P} = \frac{[E]}{[P]} \cdot \frac{(R_1[E] + [P])}{([E] + R_2[P])} \qquad (1)$$

The relation of E and P to the weight % ethylene in the polymer is as follows $$\text{weight \% ethylene} = \frac{E}{E + 1.5P} \cdot 100$$

The values of $R_1$ and $R_2$ are dependent on the particular comonomer and catalyst employed to prepare the polymer, the polymerization temperature and, to some extent, the solvent.

For all transition metal catalysts specified herein, $R_1$ is significantly larger than $R_2$. Thus, as can be seen from equation (1), ethylene will be consumed more rapidly than propylene for a given fraction of the monomer in the reacting medium. Thus, the ratio of [E]/[P] will decrease as the monomers are consumed. Only if $R_1 = R_2$ will the composition in the polymer equal that in the reacting medium.

If the amount of monomer that has reacted at a given time in a batch reactor or at a given point in a tubular reactor can be determined, it is possible through equation (1), to determine the instantaneous composition being formed at a given point along the polymer chain. Demonstration of narrow MWD and increasing MW along the tube proves the compositional distribution is intramolecular. The amount of polymer formed can be determined in either of two ways. Samples of the polymerizing solution may be collected, with appropriate quenching to terminate the reaction at various points along the reactor, and the amount of polymer formed evaluated. Alternatively, if the polymerization is run adiabatically and the heat of polymerization is known, the amount of monomer converted may be calculated from the reactor temperature profile.

Finally, if the average composition of the polymer is measured at a series of locations along the tube, or at various times in the batch polymerization case, it is possible to calculate the instantaneous composition of the polymer being made. This technique does not require knowledge of $R_1$ and $R_2$ or the heat of polymerization, but it does require access to the polymer synthesis step.

All of these methods have been employed with consistent results.

For the purpose of this patent, $R_1$ and $R_2$ thus simply serve to characterize the polymer composition in terms of the polymerization conditions. By defining $R_1$ and $R_2$, we are able to specify the intramolecular compositional distribution. In the examples shown below where $VCl_4$ and ethylaluminum sesquichloride are employed in hexane as solvent, $R_1 = 1.8 \exp(+500/RTk)$ and $R_2 = 3.2 \exp(-1500/RTk)$ Where "R" is the gas constant (1.98 col/deg-mole) and "$T_k$" is degrees Kelvin. For reference, at 20° C. $R_1 = 9.7$, $R_2 = 0.02$.

The $R_1$ and $R_2$ given above predict the correct final average polymer composition. If the $R_1$ and $R_2$ and expression (2) are someday proven to be inaccurate the polymer intramolecular compositional distribution will remain as defined herein in terms of the polymerization conditions but may have to be modified on the absolute composition scales. There is little likelihood that they are in error by more than a few percent, however.

Ethylene content is measured by ASTM-D3900 for ethylene-propylene copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed no ASTM tests covering a wide range of ethylene contents are available; however, proton and carbon-13 nuclear magnetic resonance spectroscopy can be employed to determine the composition of such polymers. These are absolute techniques requiring no calibration when operated such that all nucleii of a given element contribute equally to the spectra. For ranges not covered by the ASTM tests for ethylene-propylene copolymers, these nuclear magnetic resonance methods can also be used.

Molecular weight and molecular weight distribution are measured using a Waters 150C gel permeation chromatography equipped with a Chromatix KMX-6 (LDC-Milton Roy, Riviera Beach, Fla.) on-line light scattering photometer. The system is used at 135° C. with 1,2,4 trichlorobenzene as mobile phase. Showdex (Showa-Denko America, Inc.) polystyrene gel columns 802, 803, 804 and 805 are used. This technique is discussed in "Liquid Chromatography of Polymers and Related Materials III", J. Cazes editor. Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available LDC/Milton Roy-Riviera Beach, Flor.

As already noted, copolymers in accordance with the present invention are comprised of ethylene and at least one other alpha-o It is believed that such alpha-olefins could include those contain to 18 carbon atoms, e.g., propylene, butene-1, pentene-1, etc. Alpha-olefins of 3 to 6 carbons are preferred due to economic considerations. The most preferred copolymers in accordance with present invention are those comprised of ethylene and propylene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4-hexadiene; 1,6-octadiene;

b. branched chain acyclic dienes such as: 5-methyl-1, 4-hexadiene; 3, 7-dimethyl-1,6-octadiene; 3, 7-dimethyl-1,7-octadiene and the mixed isomers of dihydro-myrcene and dihydroocinene;

c. single ring alicyclic dienes such as: 1, 4-cyclohexadiene; 1,5-cyclooctadiene; and 1,5-cyclododecadiene;

d. multi-ring alicyclic fused and bridged ring dienes such as: tetrahydroindene; methyltetrahydroindene; dicyclopentadiene; bicyclo-(2,2,1)-hepta-2, 5-diene; alkenyl, alkylidene, cycloalkenyl and cycloalkylidene norbornenes such as 5-methylene-2-norbornene (MNB), 5-ethylidene-2-norbornene (ENB), 5-propylene-2-norbornene, 5-isopropylidene-2-norbornene, 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20% with 0% to 15% being preferred. The most preferred range is 0% to 10%.

As already noted, the most preferred copolymer in accordance with the present invention is ethylene-propylene. The average ethylene content of the copolymer could be as low as about 20% on a weight basis. The preferred minimum is about 25%. A more preferred minimum is about 30%. The maximum ethylene content could be about 90% on a weight basis. The preferred maximum is about 85%, with the most preferred being about 80%. Preferably, the copolymers of this invention intended for use as viscosity modifier-dispersant contain from about 35 to 75 wt. % ethylene, and more preferably from about 50 to 70 wt. % ethylene.

The molecular weight of copolymer made in accordance with the present invention can vary over a wide range. It is believed that the weight-average molecular weight could be as low as about 2,000. The preferred minimum is about 10,000. The most preferred minimum is about 20,000. It is believed that the maximum weight-average molecular weight could be as high as about 12,000,000. The preferred maximum is about 1,000,000. The most preferred maximum is about 750,000. An especially preferred range of weight-average molecular weight for copolymers intended for use as V.M. polymer is from 50,000 to 500,000.

The copolymers of this invention will also be generally characterized by a Mooney viscosity (i.e., ML(1,+4,) 125° C.) of from about 1 to 100, preferably from about 5 to 70, and more preferably from about 8 to 65, and by a thickening efficiency ("T.E.") of from about 0.4 to 5.0, preferably from about 1.0 to 4.2, most preferably from about 1.4 to 3.9.

Another feature of copolymer of the present invention is that the molecular weight distribution (MWD) is very narrow, as characterized by at least one of a ratio of $\overline{M}_w/\overline{M}_n$ of less than 2 and a ratio of $\overline{M}_z/\overline{M}_w$ of less than 1.8. As relates to EPM and EPDM, a typical advantage of such copolymers having narrow MWD is resistance to shear degradation. Particularly for oil additive applications, the preferred copolyers have $\overline{M}_w/\overline{M}_n$ less than about 1.5, with less than about 1.25 being most preferred. The preferred $\overline{M}_z/\overline{M}_w$ is less than about 1.5, with less than about 1.2 being most preferred.

The copolymers of the instant invention may be produced by polymerization of a reaction mixture comprised of catalyst, ethylene and at least one additional alpha-olefin monomer, wherein the amounts of monomer, and preferably ethylene, is varied during the course of the polymerization in a controlled manner as will be hereinafter described. Solution polymerizations are preferred.

Any known solvent for the reaction mixture that is effective for the purpose can be used in conducting solution polymerizations in accordance with the present invention. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Non-limiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

These polymerizations are carried out in a mix-free reactor system, which is one in which substantially no mixing occurs between portions of the reaction mixture that contain polymer chains initiated at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention.

A batch reactor is a suitable vessel, preferably equipped with adequate agitation, to which the catalyst, solvent, and monomer are added at the start of the polymerization. The charge of reactants is then left to polymerize for a time long enough to produce the desired product or chain segment. For economic reasons, a tubular reactor is preferred to a batch reactor for carrying out the processes of this invention.

In addition to the importance of the reactor system to make copolymers in accordance with the present invention, the polymerization should be conducted such that:

(a) the catalyst system produces essentially one active catalyst species,
(b) the reaction mixture is essentially free of chain transfer agents, and
(c) the polymer chains are essentially all initiated simultaneously, which is at the same time for a batch reactor or at the same point along the length of the tube for a tubular reactor.

To prepare copolymer structures II and III above (and, optionally, to prepare copolymer structure I above), additional solvent and reactants (e.g., at least one of the ethylene, alpha-olefin and diene) will be added either along the length of a tubular reactor or during the course of polymerization in a batch reactor, or to selected stages of stirred reactors in series in a controlled manner (as will be hereinafter described) to form the copolymers of this invention. However, it is necessary to add essentially all of the catalyst at the inlet of the tube or at the onset of batch reactor operation to meet the requirement that essentially all polymer chains are initiated simultaneously.

Accordingly, polymerization in accordance with the present invention are carried out:

(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

Since the tubular reactor is the preferred reactor system for carrying out polymerizations in accordance with the present invention, the following illustrative descriptions are drawn to that system, but will apply to other reactor systems as will readily occur to the artisan having the benefit of the present disclosure.

In practicing polymerization processes in accordance with the present invention, use is preferably made of at least one tubular reactor. Thus, in its simplest form, such a process would make use of but a single, reactor. However, as would readily occur to the artisan having the benefit of the present disclosure, a series of reactors could be used with multiple monomer feed to vary intramolecular composition as described below.

The composition of the catalyst used to produce alpha-olefin copolymers has a profound effect on copolymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. Ver Strate, *Macromolecules,* 4, 482 (1971), which is incorporated herein by reference.

It is disclosed by the authors that copolymers made in a continuous flow stirred reactor should have an MWD characterized by $\overline{M}_w/\overline{M}_n=2$ and a narrow Inter-CD when one active catalyst species is present. By a combination of fractionation and gel permeation chromatography (GPC) it is shown that for single active species catalysts the compositions of the fractions vary no more than ±3% about the average and the MWD (weight- to number-average ratio) for these samples approaches 2. It is this latter characteristic ($\overline{M}_w/\overline{M}_n$ of about 2) that is deemed the more important in identifying a single active catalyst species. On the other hand, other catalysts gave copolymer with an Inter-CD greater than ±10% about the average and multi-modal MWD often with $\overline{M}_w/\overline{M}_n$ greater than 10. These other catalysts are deemed to have more than one active species.

Catalyst systems to be used in carrying out processes in accordance with the present invention may be Ziegler catalysts, which may typically include:

(a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention comprises hydrocarbon-soluble vanadium compound in which the vanadium valence is 3 to 5 and an organo-aluminum compound, with the proviso that the catalyst yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

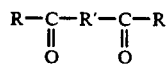 (1)

$VCl_x(OR)_{3-x}$ where x = 0–3 and R = a hydrocarbon radical;

$VCl_4$;

$VO(AcAc)_2$, where AcAc = acetyl acetonate which may or may not be alkyl-substituted (e.g., $C_1$ to $C_6$ alkyl);

$V(AcAc)_3$;

V(dicarbonyl moiety)3;
$VOCl_x(AcAc)_{3-x}$,

-continued
where x = 1 or 2;
V(dicarbonyl moiety)3Cl; and
$VCl_3 \cdot nB$, where n=2–3, B=Lewis base capable of making hydrocarbon-soluble complexes with $VCl_3$, such as tetrahydrofuran, 2-methyl-tetrahydrofuran and dimethyl pyridine, and the dicarbonyl moiety is derived from a dicarbonyl compound of the formula:

In formula (1) above, each R (which can be the same or different) preferably represents a $C_1$ to $C_{10}$ aliphatic, alicyclic or aromatic hydrocarbon radical such as ethyl (Et), phenyl, isopropyl, butyl, propyl, n-butyl, i-butyl, t-butyl, hexyl, cyclohexyl, octyl, naphthyl, etc. R, preferably represents an alkylene divalent radical of 1 to 6 carbons (e.g., $-CH_2-$, $-C_2H_4-$, etc.). Nonlimiting illustrative examples of formula (1) compounds are vanadyl trihalides, alkoxy halides and alkoxides such as $VOCl_3$, $VOCl_2$ (OBu) where Bu=butyl, and VO-$(OC_2H_5)_3$. The most preferred vanadium compounds are $VCl_4$, $VOCl_3$, and $VOCl_2(OR)$.

As already noted, the co-catalyst is preferably organo-aluminum compound. In terms of chemical formulas, these compounds could be as follows:

| | |
|---|---|
| $AlR_3$, | $Al(OR)R_2$, |
| $AlR_2Cl$, | $R_2Al-AlR_2$, |
| $AlR,RCl$, | $AlR_2I$, |
| $Al_2R_3Cl_3$, | and |
| $AlRCl_2$, | | where R and R, represent hydrocarbon radicals, the same or different, as described above with respect to the vanadium compound formula. The most preferred organo-aluminum compound is an aluminum alkyl sesquichloride such as $Al_2Et_3Cl_3$ or $Al_2(iBu)_3Cl_3$.

In terms of performance, a catalyst system comprised of $VCl_4$ and $Al_2R_3Cl_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25, however, a maximum of about 17 is more preferred. The most preferred maximum is about 15.

With reference again to processes for making copolymer in accordance with the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetrahydrofuran, pyridine, tributylamine, tetrahydrothiophene, etc., can be added to the polymerization system using techniques well known to those skilled in the art.

Chain transfer agents for the Ziegler-catalyzed polymerization of alpha-olefins are well known and are illustrated, by way of example, by hydrogen or diethyl zinc for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution and Inter-CD. Thus the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organoaluminum cocatalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen Furthermore, if the Al/V ratio has an effect on the molecular weight of copolymer product, that Al/V should be used which gives the highest molecular weight also at acceptable catalyst activity. Chain transfer with propylene can best be limited by avoiding excessively elevated temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organoaluminum) in each other's presence outside of the reactor, should preferably be kept within limits. If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment, could be as low as about 0.1 second. The preferred minimum aging period is about 0.5 second, while the most preferred minimum aging period is about 1 second. While the maximum aging period could be higher, for the preferred vanadium/organo-aluminum catalyst system the preferred maximum is about 200 seconds. A more preferred maximum is about 100 seconds. The most preferred maximum aging period is about 50 seconds. The premixing could be performed at low temperature such as 40° C. or below. It is preferred that the premixing be performed at 25° C. or below, with 20° C. or below being most preferred.

Preferably, the catalyst components are premixed in the presence of the selected polymerization diluent or solvent under rapid mixing conditions, e.g., at impingement Reynolds Numbers (NRE) of at least 10,000, more preferably at least 50,000, and most preferably at least 100,000. Impingement Reynolds number is defined as $$N_{RE} = \frac{DN\rho}{\mu}$$

where N is fluid flow velocity (cm./sec.), D is inside tube diameter (cm), $\rho$ is fluid density (g./cm.$^3$) and $\mu$ is fluid viscosity (poise).

The temperature of the reaction mixture should also be kept within certain limits. The temperature at the reactor inlets should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerization. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from −50.C to 150° C. It is believed that the outlet temperature of the reaction mixture could be as high as about 200° C. The preferred maximum outlet temperature is about 70° C. The most preferred maximum is about 60° C. In the absence of reactor cooling, such as by a cooling jacket, to remove the heat of polymerization, it has been determined (for a mid-range ethylene content EP copolymer and a solvent with heat capacity similar to hexane) that the temperature of the reaction mixture will increase from reactor inlet to outlet by about 13° C. per weight percent of copolymer in the reaction mixture (weight of copolymer per weight of solvent).

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 13° C. for each weight percent copolymer or 5 wt %×13.C/wt. % =65° C. To maintain an outlet temperature of 35° C., it will thus require a feed that has been prechilled to 35° C.–65° C. = −30° C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt/100 wt. There is no lower limit to concentration due to reactor operability, but for economic reasons it is preferred to have a copolymer concentration of at least 2 wt/100 wt. Most preferred is a concentration of at least 3 wt/100 wt.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains but also to minimize radial temperature gradients due to the heat generated by the polymerization reaction. Radial temperature gradients in the case of multiple segment polymers will tend to broaden the molecular weight distribution of the copolymer since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 0.2 second. A preferred minimum is about 0.5 second. The most preferred minimum is about 1 second. It is believed that the maximum could be as high as about 3600 seconds. A preferred maximum is about 40 seconds. The most preferred maximum is about 20 seconds.

Preferably, the fluid flow of the polymerization reaction mass through the tubular reactor will be under turbulent conditions, e.g., at a flow Reynolds Number (NR) of at least 10,000, more preferably at least 50,000, and most preferably at least 100,000 (e.g., 150,000 to 250,000), to provide the desired radial mixing of the fluid in the reactor. Flow Reynolds Number is defined as $$NR = \frac{D'N'\rho}{\mu}$$

wherein N′ is fluid flow velocity (cm./sec.), D, is inside tube diameter of the reactor (cm.), $\rho$ is fluid density (g./cm.$^3$) and $\mu$ is fluid viscosity (poise).

If desired, catalyst activators for the selected vanadium catalysts can be used as long as they do not cause the criteria for a mix-free reactor to be violated, typically in amounts up to 20 mol %, generally up to 5 mol%, based on the vanadium catalyst, e.g., butyl perchlorocrotonate, benzoyl chloride, and other activators disclosed in U.S. Pat. Nos. 4,808,387 and 4,871,523 the disclosures of which are hereby incorporated by reference in their entirety. Other useful catalyst activators include esters of halogenated organic acids, particularly alkyl trichloroacetates, alkyl tribromoacetates, esters of ethylene glycol monoalkyl (particularly monoethyl) ethers with trichloroacetic acid and alkyl perchlorocrotonates, and acyl halides. Specific examples of these compounds include benzoyl chloride, methyl trichloroacetate, ethyl trichloroacetate, methyl tribromoacetate, ethyl tribromoacetate, ethylene glycol monoethyl ether trichloroacetate, ethylene glycol monoethyl ether tribromoacetate, butyl perchlorocrotonate and methyl perchlorocrotonate.

By practicing processes in accordance with the present invention, alpha-olefin copolymers having very narrow MWD can be made by direct polymerization. Although narrow MWD copolymers can be made using other known techniques, such as by fractionation or mechanical degradation, these techniques are considered to be impractical to the extent of being unsuitable for commercial-scale operation. As regards EPM and EPDM made in accordance with the present invention, the products have good shear stability and (with specific intramolecular CD) excellent low temperature properties which make them especially suitable for lube oil applications.

It is preferred that the Intra-CD of the copolymer is such that at least two portions of an individual intramolecularly heterogeneous chain, each portion comprising at least 5 weight percent of said chain, differ in composition from one another by at least 5 weight percent ethylene. The Intra-CD can be such that at least two portions of copolymer chain differ by at least 10 weight percent ethylene. Differences of at least 20 weight percent, as well as, 40 weight percent ethylene are also considered to be in accordance with the present invention.

It is also preferred that the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

Particularly preferred ethylene copolymers are those having a weight-average molecular weight of from about 20,000 to about 250,000.

GRAFTING MATERIALS

The materials or compounds that are grafted on the ethylene copolymer backbone to form the grafted ethylene polymers of the instant invention are those materials that can be grafted onto said ethylene copolymers under grafting conditions which do not adversely affect the narrow MWD, i.e., broaden the MWD, as described hereinafore, of these copolymers. These materials preferably contain olefinic unsaturation and further preferably contain at least one of carboxylic acid moiety, ester moiety, anhydride moiety, hydroxyl moiety, sulfur atom, nitrogen atom, and oxygen atom. The olefinically unsaturated portion, i.e., ethylenically unsaturated portion, is one which is capable of reacting with the ethylene copolymer backbone and upon reaction therewith becomes saturated.

These materials are generally well known as grafting materials in the art and are generally commercially available or may be readily prepared by well known conventional methods.

These materials include, for example, unsaturated mono-and polycarboxylic acids, preferably the $C_4$–$C_{10}$ acids, with preferably at least one olefinic unsaturation, and anhydrides, salts, esters, ethers, amides, nitriles, thiols, thioacids glycidyl, cyano, hydroxy, glycol and other substituted derivatives of said acids. Preferred carboxylic acid grafting materials are (i) the monounsaturated $C_4$ to $C_{10}$ dicarboxylic acids wherein (a) the carboxyl groups are vicinyl (i.e., located on adjacent carbon atoms), and (b) at least one, preferably both, of the adjacent carbon atoms are part of said mono unsaturation; or (ii) derivatives of (i) such as anhydrides or $C_1$ to $C_5$ alcohol derived mono- or diesters of (i). Upon reaction with the ethylene-alpha-olefin copolymer, the monounsaturation of the dicarboxylic acid, anhydride, or ester becomes saturated. Thus, for example, maleic anhydride becomes an ethylene-alpha-olefin substituted succinic anhydride.

Examples of such acids, anhydrides and derivatives thereof include maleic acid, fumaric acid, himic acid, itaconic acid, citraconic acid, acrylic acid, glycidyl acrylate, cyanoacrylates, hydroxy $C_1$–$C_{20}$ alkyl methacrylates, acrylic polyethers, acrylic anhydride, methacrylic acid, crotonic acid, isocrotonic acid, mesaconic acid, angelic acid, amleic anhydride, itaconic anhydride, citraconic anhydride, himic anhydride, acrylonitrile, methacrylonitrile, sodium acrylate, calcium acrylate, and magnesium acrylate.

Other monomers which can be used either by themselves or in combination with one or more of the carboxylic acids or derivatives thereof include $C_2$–$C_{50}$ vinyl monomers such as acrylamide, acrylonitrile and monovinyl aromatic compounds, i.e., styrene, chlorostyrenes, bromostyrenes, -methyl styrene, vinyl pyridines and the like.

Other monomers which can be used are $C_4$ to $C_{50}$ vinyl esters, vinyl ethers and allyl esters, such as vinyl butyrate, vinyl laurate, vinyl stearate, vinyl adipate and the like, and monomers having two or more vinyl groups, such as divinyl benzene, ethylene dimethacrylate, triallyl phosphite, dialkylcyanurate and triallyl cyanurate.

A large proportion of the materials falling in this class will be polymerizable monomers, but not all. Some will be materials which are reactive with the base polymer, but do not form polymers, i.e., maleic anhydride.

Also, a large proportion of the materials falling in the class will have functionality in addition to unsaturation, but not necessarily so, i.e., styrene or ethylene.

A subgeneric definition that encompasses a class of suitable reactants is as follows:

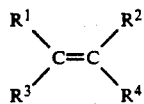

wherein:

(a) when $R^1 = R^2 = R^3 = R^4$ is H or halogen, preferably F and Cl;
(b) when $R^1$ and $R^2$ are H, $R^3$ is H, halogen, or $C_1$–$C_{10}$ alkyl and $R_4$ is halogen —COOOR$^5$,

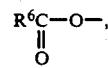

$C_1$ to $C_{50}$, preferably $C_1$ to $C_{30}$ and most preferably $C_1$ to $C_{10}$ alkyl, aryl, alkaryl, and substituted derivatives thereof,

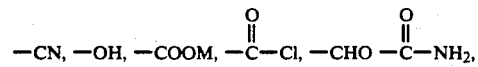

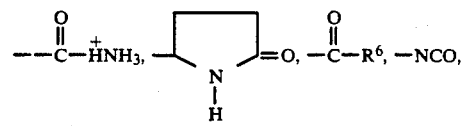

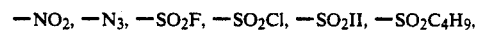

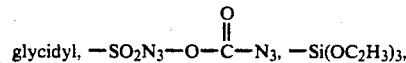

—SO—$C_2H_3$, $SO_2C_2H_5$, wherein $R^5$=H or $R^6$ and $R^6$ is a $C_1$ to $C_{30}$ hydrocarbon group and M is a metal of any valance; and c) $R^1$ and $R^3$ are H and $R^2$ and $R^4$ are connected into a strained ring compound having 4 to 50 carbon atoms such as himic acids.

Since post-treating processes involving the use of these post-treating reagents are known insofar as application to conventional grafted ethylene copolymers of the prior art, detailed descriptions of these processes herein are unnecessary. In order to apply the prior art processes to the compositions of this invention, all that is necessary is that reaction conditions, ratio of reactants, and the like as described in the prior art, be applied to the novel compositions of this invention. The following is a list of suitable reactants for the post treating process:

1) esters of unsaturated alcohols;
2) esters of saturated alcohols with unsaturated acids;
3) unsaturated ethers;
4) unsaturated ketones;
5) unsaturated, polar, nitrogen-containing hydrocarbon compounds;
6) unsaturated carboxylic acid materials;
7) maleic acid or anhydride and one or more other monomers; copolymerizable therewith;
(8) methacrylates and acrylates, both monomeric and polymeric; and
(9) oxygen- or sulfur-containing vinyl heterocyclic compounds; and mixtures thereof.

Some specific non-limiting illustrations of compounds of group (1) include esters of unsaturated alcohols such as allyl, methallyl, crotyl, 1-chloroallyl, chloroallyl, cinnamyl, vinyl, methylvinyl, 1-phenallyl, and butenyl with (a) saturated acids such as acetic, propionic, butyric, valeric, capric, and stearic; (b) unsaturated acids such as acrylic, alpha-substituted acrylic (including alkylacrylic, e.g., methacrylic, ethylacrylic, propylacrylic, and arylacrylic such as phenylacrylic), crotonic, oleic, linoleic, and linolenic; (c) polybasic acids such as oxalic, malonic, succinic, glutaric, adipic, pimelic, suberic, azelaic, and sebacic; (d) unsaturated polybasic acids such as maleic, fumaric, citracenic, mesaconic, itaconic, methylenemalonic, acetylenedicarboxylic, and conicic; and (e) aromatic acids such as benzoic, phenylacetic, phthalic, terephthalic and benzolphthalic. Illustrative of the group (1)(a) esters are vinyl acetate and the vinyl esters of an acid of the formula

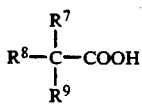

wherein $R^7$–$R^9$ are independently selected from saturated alkyl groups, said acid containing about 10 carbon atoms. These esters are disclosed in U.S. Pat. Nos. 3,687,849 and 3,551,336, both of which are incorporated herein by reference.

Some specific non-limiting illustrations of compounds of group (2) include esters of saturated alcohols such as methyl, ethyl, propyl, isopropyl, butyl, iso-butyl, sec-butyl, tert-butyl, 2-ethylhexyl, cyclohexyl, bekenyl, ethylene glycol, diethanolamino-ethanol, ethanolamine, and diethylene glycol with unsaturated aliphatic mono-basic and unsaturated polybasic acids, examples of which are illustrated in (1)(b) and (1)(d) above. The preferred unsaturated polybasic acids are the alpha, beta-unsaturated dibasic acids yielding esters such as ethyl fumarate, octyl fumarate and lauryl maleate. These esters are described in U.S. Pat. Nos. 3,687,849 and 3,551,336, both of which are incorporated herein by reference.

Some illustrative non-limiting examples of compounds of group (3) include methyl vinyl ether, ethyl vinyl ether, cyclohexyl vinyl ether, octyl vinyl ether, diallyl vinyl ether, ethyl methallyl ether and allyl ethyl ether. These ethers are preferably olefinically unsaturated aliphatic or cycloaliphatic ethers containing up to about 20 carbon atoms. Such ethers are described in U.S. Pat. No. 3,687,849, incorporated herein by reference.

Some illustrative non-limiting examples of the unsaturated ketones of group (4) include methyl vinyl ketone, ethyl vinyl ketone, propyl vinyl ketone, and pentyl vinyl ketone. These ketones are preferably olefinically unsaturated aliphatic ketones containing up to about 20 carbon atoms. Such ketones are described in U.S. Pat. No. 3,687,849, incorporated herein by reference.

The olefinically unsaturated, polar, nitrogen-containing compounds, i.e., enophiles, of group (5) are well known in the art and are described, inter alia, in U.S. Pat. Nos. 3,089,832, 4,092,255, 4,146,489, 4,194,984 and 4,051,050 and United Kingdom Patent Nos. 1,601,079, 1,558,991 and 1,578,667, all of which are incorporated herein by reference. These compounds may be acyclic or heterocyclic. If they are heterocyclic, they will generally have the ethylenically unsaturated moiety, e.g., vinyl, attached to a ring atom of the heterocyclic ring such as the nitrogen atom or a carbon atom. The principal requirement of the nitrogen-containing compounds are the presence of a nitrogen atom and an unsaturated portion, i.e., ethylenic unsaturation, capable of reacting with the ethylene copolymer backbone. Thus, in its broadest form, the ethylenically unsaturated nitrogen-containing reactant may be selected from a broad group of tetra-substituted olefins. Thus, the reactant can be represented by the general formula:

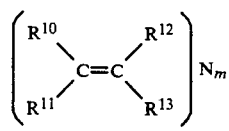

wherein $R^{10}$, $R^{11}$, $R^{12}$, and $R^{13}$ may be the same or different at least one being an electron-attracting group, N represents a nitrogen moiety and m ranges from 1 to 50. Thus, the only restriction placed upon said groups is that the final reactant contains at least one nitrogen atom. In this manner, the ethylenically unsaturated nitrogen-containing reactant may be represented by the above general formula where $R^{10}$, $R^{11}$, $R^{12}$, and $R^{13}$ are independently selected from the groups consisting of hydrogen and $C_1$ to $C_{30}$ straight and branched chain alkyl, arylalkyl, cycloalkyl, alkenyl, arylalkenyl and cycloalkenyl moieties and/or one or more reactive groups of the class consisting of alkyl unsaturation, cyano, carboxyl, epoxide, thiol, carbonyl, isocyanate, thionyl, amido, hydroxy, imino, acylhalide, halo, lactamo, lactono, dicarboxylic acid anhydride, thiolic anhydride, thionic anhydride, dithionic anhydride, disubstituted amino, trisubstituted amino, ureido, isourea and dicarboxylamic acid anhydride or one-half of cyclic dicarboxylic acid anhydrides as in maleic anhydride or one-half of cyclic thionic anhydride or one-half of cyclic dithionic anhydride or one half of cyclic dicarboxylic amic acid anhydride or one-half of cyclic N $C_{1-18}$ hydrocarbyl imides such as N-dodecylmaleimide and pyrrolidine.

The term "$N_m$", as used in the above formula, is intended to indicate that the nitrogen-containing group or moiety is present in one or more of the "R" groups, and/or several nitrogen-containing groups may be present in the same "R" group; however, there must be at least one N-containing moiety in the reactant with a preferred range of m of 1 to 10, more preferably 1 to 5. Thus, in acrylonitrile, $R^{10}$, $R^{11}$ and $R^{12}$ are hydrogen atoms while $X=1$; that is, $R^{13}$ is a "CN" group. Examples of these groups include alpha-chloroacrylonitrile, N,N-dibutyl acrylamide, acrylamide, N-t-octyl acrylamide; thioacrylamide, N-n-octylacrylamide, vinylidene cyanide, N-acryloyl-morpholine, N,N-dimethylamino ethyl methacrylate, t-dodecylaminoethyl acrylate, N-octyl maleimide, N-vinyl-5-methyl-2-pyrrolidone, pyrrolidinyloctyl vinyl sulfide, N-vinylethyleneurea, N-vinyl-1,2-propyleneurea, N-vinylcarbazole, butanamido-decyl vinyl ether, acetamidooctadecyl vinyl ether, ureidoethyl vinyl ether, 2-vinyl-5-methylpyridine, and tetracyanoethylene.

Included within this group are compounds represented by the formula

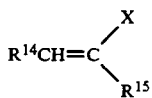

wherein

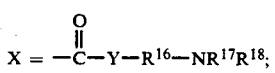

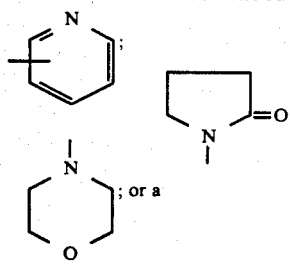

polynuclear aromatic amino group;

$R^{14}$ is either hydrogen or a $C_1$ to $C_4$ alkyl group;

$Y=O$ or $NR^{19}$;

$R^{15}$, $R^{17}$, $R^{18}$ and $R^{13}$ are independently selected from hydrogen and alkyl groups, preferably $C_1$–$C_{20}$ alkyl groups; and $R^{16}$ is a methylene or polymethylene having up to 16 carbon atoms.

Some illustrative non-limiting examples of the polar, olefinically unsaturated nitrogen containing compounds include N-vinyl pyrrolidone, vinylpyridines, C-vinyl-pyridines such as 2-vinylpyridine, 4-vinylpyridine, and lower alkyl ($C_1$–$C_8$) substituted C-vinyl-pyridines such as 2-methyl-5-vinylpyridine, 2-methyl-4-vinylpyridine, 2-vinyl-5-ethyl pyridine and 2-vinyl-6-methylpyridine. Other polar nitrogen compounds include, but are not limited to, dimethyl-aminoethyl methacrylate or acrylate, vinylimidazole, N-vinylcarboazole, N-vinylsuccinimide, acrylonitrile, o-, m-, or p-aminostyrene, maleimide, N-vinyl oxazolidone, N,N-dimethylaminoethyl vinyl ether, ethyl 2-cyanoacrylate, vinyl acetonitrile, N-vinylphthalimide, and 2-vinylquinoline; a variety of acrylamides and methacrylamides such as N-[1,1-dimethyl-3-oxabutyl] acrylamide, N-[1,2-dimethyl-1-ethyl-3-oxobutyl] acrylamide, N-(1,3-diphenyl-1-methyl-3-oxopropyl)acrylamide, N-(1-methyl-1-phenyl-3-oxobutyl) methacrylamide, N,N-diethylaminoethyl acrylamide, and 2-hydroxyethyl acrylamide; a variety of N-vinylcaprolactams or their thio-analogs, such as N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone, 3,4,5-trimethyl-3-ethyl-1-vinylpyrrolidone, and other lower alkyl substituted N-vinylpyrrolidones; N-vinylbenzyldimethylamine, N-dimethylaminipropyl acrylamide and methacrylamide, N-methacryloxyethylpyrrolidone, N-methacryloxyethylmorpholine, N-methacryloxyethylmorpholine, N-maleimide of dimethylaminopropylamine, and the N-methacrylamide of aminoethylethyleneurea; a variety of vinylimidazoles or vinyl imidazolines such as N-vinylimidazole, N-vinyl methyl-2-imidazole, N-vinyl ethyl-2-imidazole, N-vinylbenzimidazole, N-vinyl methyl-2-imidazoline, N-vinyl phenyl-2-imidazoline and vinyl-2-imidazole.

Also included within the enophiles are the unsaturated nitriles having the formula:

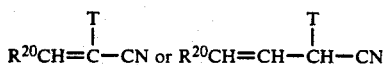

wherein $R^{14}$ is a hydrogen or a lower alkyl, e.g., methyl, ethyl, and the like, T is a hydrogen atom, a halogen atom, a cyano or a lower alkyl group, e.g., methyl, ethyl, propyl, butyl and the like. Non-limiting examples of nitrile monomers include acrylonitrile, methacylonitrile, alpha-bromoacrylonitrile, alpha-chloroacrylonitrile, vinylidine cyanide and allyl cyanide.

The ethylenically unsaturated carboxylic acid materials of group (6) are generally (i) ethylenically monounsaturated $C_4$ to $C_{10}$ dicarboxylic acids wherein (a) the carboxyl groups are vicinyl, i.e., located on adjacent carbon atoms, and (b) at least one, preferably both, of said adjacent carbon atoms are part of said mono unsaturation; or (ii) derivatives of (i) such as anhydrides or $C_1$ to $C_5$ alcohol derived mono- or diesters of (i). Upon reaction with the ethylene copolymer, the monounsaturation of the dicarboxylic acid, anhydride or ester becomes saturated. Thus, for example, maleic anhydride becomes hydrocarbyl substituted succinic anhydride.

Also included within this category are the ethylenically monounsaturated monocarboxylic acid materials. The monocarboxylic acid materials include (1) monounsaturated $C_3$ to $C_{10}$ monocarboxylic acid wherein the carbon-carbon bond is conjugated to the carboxy group, i.e., of the structure

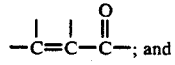

(2) derivatives of (1) such as $C_1$ to $C_5$ alcohol derived monoesters of (1). Upon reaction with the ethylene copolymer, the monounsaturation of the monounsaturated carboxylic acid material becomes saturated. Thus, for example, acrylic acid becomes an ethylene copolymer substituted propionic acid, and methacrylic acid becomes an ethylene copolymer substituted isobutyric acid.

Exemplary of such unsaturated mono- and dicarboxylic acids, or anhydrides thereof include fumaric acid, itaconic acid, maleic acid, maleic anhydride, chloromaleic anhydride, acrylic acid, methacrylic acid, crotonic acid, cinnamic acid, methyl acrylate, ethyl acrylate, methyl methacrylate, etc.

Preferred carboxylic acid materials are the dicarboxylic acid anhydrides. Maleic anhydride or a derivative thereof is particularly preferred as it does not appear to homopolymerize appreciably but grafts onto the ethylene copolymer to give two carboxylic acid functionalities. Such preferred materials have the generic formula

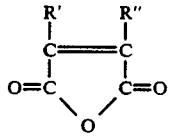

wherein R' and R" are independently hydrogen or a halogen.

These group 6 materials are particularly preferred as the grafting materials in the present invention.

The group (7) grafting materials are a system comprising (a) unsaturated polycarboxylic acids or anhydrides which can be grafted, preferably by free radical addition, onto the polymeric backbone, and (b) one or more other monomers different from (a) copolymerizable therewith. Representative of such unsaturated polycarboxylic acids or anhydrides are maleic acid, fumaric acid, citraconic acid, mesaconic acid, itaconic acid, methylenemalonic acid, acetylenedicarboxylic acid, aconitic acid, the anhydrides of any of the foregoing acids, and similar acids and anhydrides containing about 4 to 12 carbon atoms. Maleic acid or maleic anhydride is preferred. Mixtures of any of the acids or anhydrides may be used.

The monomers (b) copolymerizable with the unsaturated mono- or dicarboxylic acids or anhydrides, preferably maleic acid or anhydride are any alpha, beta-monoethylenically unsaturated monomers which are sufficiently soluble in the reaction medium and reactive towards said unsaturated polycarboxylic acid or anhydrides so that substantially higher amounts of said acid or anhydride can be incorporated into the grafted polymeric product than is obtainable using said acid or anhydride alone. Suitable monomers include the esters, amides, and nitriles of acrylic and methacrylic acid, and other monomers containing no free acid groups. Representative of these classes are the methyl, ethyl, propyl, butyl, pentyl, hexyl, cyclohexyl, 2-ethylhexyl, and isodecyl esters of acrylic or methacrylic acid. Other useful monomers are styrene, alpha-methyl styrene, $C_1$-$C_4$ alkyl and alkoxy ring substituted styrenes such as p-methyl styrene, p-sec. butyl styrene, p-methoxy styrene, and $C_4$-$C_{17}$ alpha olefins such as isobutylene, and the like. Other types of monomers are the vinyl esters such as vinyl acetate, propionate and butyrate; vinyl ketones such as methyl and ethyl vinyl ketone; and other vinyl and vinylidene monomers such as vinyl chloride and vinylidene chloride. Any mixtures of two or more of the comonomers may be used. Comonomers containing more than one polymerizable double bond and/or functional groups which may induce crosslinking or gelation, such as hydroxyl, primary and secondary amino groups, should be avoided. Conjugated diolefins, such as butadiene, may be used in minor amounts since such monomers have less tendency to crosslink than do the non-conjugated diolefins. Although the monomers may contain up to about 40 carbon atoms, those containing up to about 10 carbon atoms are preferred. The higher carbon content monomers add weight and cost but confer no appreciable advantage in terms of ease of copolymerization with said acid or anhydride (a).

Extensive studies have been made of the reactivity of maleic anhydride with other monomers, including reactivity ratios which will enable the polymer chemist to easily select the monomers and monomer proportions for optimizing the incorporation of maleic anhydride into the graft copolymers of the invention, ranging from the ideal of monomers which alternate with maleic anhydride in each of the grafts to monomers which form blocks of random chains with maleic anhydride in each of the grafts. Such studies include Flory, Principles of Polymer Chemistry, Cornell University Press, 1953, pps. 178-199, especially Tables XX and XXII, and Brandrup and Immergut, Polymer Handbook, 2nd Ed., 1975, John Wiley & Sons, Inc., pages II-105, II-227 to 229.

The monomer ratios will depend on the reactivity of the monomers selected, more comonomers being required when a monomer is chosen which has a greater tendency to homopolymerize than to copolymerize with said acid or anhydride such as maleic acid or anhydride. Generally, the ratio will be in the range of about 1:4 to about 4:1, of acid or anhydride such as maleic acid or anhydride to comonomer, preferably about 1:2 to 2:1. Sufficient acid or anhydride such as maleic acid or anhydride should be present in the monomer system to provide about 1-10% by weight of acid or anhydride such as maleic acid or anhydride in the graft copolymer product, based on the weight of the product, preferably about 2-6% by weight.

Such grafting materials of group (7) are described in U.S. Pat. Nos. 4,160,739 and 4,161,452 incorporated herein by reference.

Included within the scope of the methacrylates and acrylates of group (8) are the monomeric and polymeric methacylates and acylates. The monomeric methacrylates and acrylates include the esters represented by the formula

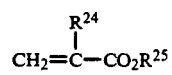

wherein:

$R^{24}$ is hydrogen or alkyl, preferably of from 1 to 3 inclusive carbon atoms, as exemplified by methyl, ethyl and propyl; and $R^{25}$ is alkyl of from 1 to 30 inclusive carbon atoms exemplified by methyl, ethyl, propyl, butyl, pentyl, hexyl, isopropyl, neopentyl, isobutyl, tertiarybutyl, hexadecyl, octadecyl, eicosyl, docosyl, pentacosyl and isomers and mixtures thereof. Also included within the scope of the monomeric methacrylates and acrylates are acrylic acid and methacrylic acid.

The polymeric methacrylates and acrylates, i.e., polymethacrylates and polyacrylates, are polymers comprised of one or more of these monomers.

The methacrylate monomers and polymers are described, for example in U.S. Pat. Nos. 3,089,832 and 4,811,031, both of which are incorporated herein by reference.

Also falling within the scope of the methacrylates are the polymethacrylates comprised of monomer members selected from dialkylaminoalkylmethacrylates, mixtures thereof with the aforedescribed alkyl methacrylates, and mixtures of the aforedescribed alkyl methacrylates. Such polymethacrylates based on dialkylaminoalkylmethacrylates, mixtures thereof with alkyl methacrylates, and mixtures of ethyl methacrylates are described in U.S. Pat. No. 3,879,304, incorporated herein by reference.

The dialkylaminoalkylmethacrylate monomers are represented by the general formula

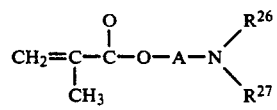

where $R^{26}$ and $R^{27}$ are independently alkyl of 1 to 2 carbon atoms and A is alkadiyl of from 2 to 4 carbons. Some examples of these dialkylaminoalkylmethacrylates are N,N-dimethylaminoethyl methacrylate, N,N-diethylaminoethyl methacrylate, N,N-dimethylaminopropyl methacrylate and N,N-diethylaminopropyl methacrylate.

The oxygen or sulfur containing heterocyclic compounds of group (9) are disclosed in U.S. Pat. No. 3,687,849, incorporated herein by reference. Some illustrative non-limiting examples of these compounds are vinylfuran, vinylbenzofuran, N-vinylthiopyrrolidone, and N-vinyloxazolidone.

Groups (2)–(9) of grafting materials are not mutually exclusive but may, in some instances, overlap. Thus, for example, some of the compounds falling in group (8) are also encompassed by group (5), e.g., acrylonitriles and acrylamides.

In the practice of the instant invention only one ethylenically unsaturated grafting material may be used or a mixture of two or more different grafting materials may be utilized.

Grafting of the Ethylene Copolymer

The process utilized in grafting of the ethylene copolymer (i) with the ethylenically unsaturated grafting material (ii) is important. The grafting conditions, particularly temperature, must be such that the narrow MWD as defined herein of the ethylene copolymer reactant is not adversely affected, i.e., is not substantially broadened. For the purposes of this application the MWD is considered to be substantially adversely affected, i.e., substantially broadened, if the difference in MWD between the ungrafted ethylene-alpha-olefin copolymer and the grafted ethylene-alpha-olefin copolymer is greater than about 10%. That is to say the grafting conditions are those which are effective to yield a graft copolymer which contains an ethylene copolymer backbone having substantially the same or similar MWD distribution as the ethylene copolymer reactant. By substantially the same or similar MWD is meant a MWD which is 10% or less different from the MWD of the ungrafted ethylene-alpha-olefin copolymer, i.e., the difference between the MWD of ungrafted ethylene-alpha-olefin copolymer and grafted ethylene-alpha-olefin copolymer is no more than about 10%. If a high shear and high temperature grafting method such as extruder grafting is utilized the narrow MWD, as defined hereinafore, of the ethylene copolymer is substantially adversely affected, i.e., is substantially broadened. That is to say the resultant grafted ethylene copolymer no longer has the narrow MWD of the ungrafted ethylene copolymer. This type of grafted ethylene copolymer does not exhibit the same advantageous mechanical properties, e.g., improved shear stability, and generally does not provide the same benefit in low temperature viscometric behavior to an oleaginous composition as a grafted ethylene copolymer of the instant invention having substantially the narrow MWD of the ungrafted ethylene copolymer.

Generally, the grafting conditions used to graft the grafting material, e.g., maleic anhydride, onto the ethylene-alpha-olefin copolymer depend, to a degree, upon the MWD of the ungrafted ethylene-alpha-olefin copolymer reactant. In general, the lower the MWD of the ungrafted copolymer reactant the milder the grafting conditions, i.e., temperature and/or shear, that are utilized to produce a grafted ethylene-alpha-olefin copolymer having a MWD which differs 10% or less from the MWD of the ungrafted ethylene-alpha-olefin copolymer reactant. Thus, with ungrafted ethylene-alpha-olefin copolymers having a higher MWD, harsher grafting conditions, i.e., higher temperatures and greater shear, can be used than with ungrafted copolymers having a lower MWD to produce grafted ethylene-alphaolefin copolymers having a MWD which differs, e.g., is higher, from the MWD of the ungrafted ethylene-alpha-olefin copolymer reactant by less than about 10%. Generally, grafting must be carried out at temperatures below about 225° C., preferably below about 200° C., more preferably below about 190° C., and most preferably below about 180° C. in order to produce a grafted copolymer having this narrow MWD. Higher temperatures will result in a grafted polymer wherein the backbone portion no longer has the substantially narrow MWD as described herein.

When these ethylenically unsaturated grafting materials are grafted onto the aforedescribed ethylene copolymer the resultant grafted copolymer contains the residue of the ethylene copolymer as the backbone and the residue of the ethylenically unsaturated grafting material as the product or grafted moiety. By residues is meant the respective moieties produced by and remaining after the grafting process or reaction. Thus, for example, while the ethylenically unsaturated grafting material may be maleic anhydride, after the grafting reaction it is the succinic anhydride moiety that is grafted or attached to the ethylene copolymer. Thus, this succinic anhydride moiety is referred to herein as the residue of the ethylenically unsaturated grafting material, i.e., residue of maleic anhydride.

A preferred method of grafting is by free-radical induced grafting in solvent, preferably in a mineral lubricating oil as solvent. The free-radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-di-methyl-hex-3-yne-2, 5 bis-tertiary-butyl peroxide (sold as Lupersol 130) or its hexane analogue, di-tertiary butyl peroxide and dicumyl peroxide. The initiator is generally used as a level of between about 0.005% and about 1%, based on the total weight of the polymer solution, and temperatures of about 150° to 220° C.

The ethylenically unsaturated grafting material is typically used in an amount ranging from about 0.01% to about 10%, preferably 0.1 to 2.0%, based on weight of the initial total solution. The grafting material and free radical initiator are generally used in a weight percent ratio range of 1.0:1 to 30:1, preferably 3.0:1 to 6:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. Furthermore, the presence of oxygen in combination with the use of temperatures at or near the upper temperature limits, e.g., 225° C., deleteriously affects the narrow MWD of the backbone polymer. Thus, if oxygen is present the temperatures under which grafting is carried out should generally be reduced, e.g., reduced from below about 225° C. to below about 200° C. The grafting time will usually range from about 0.1 to 12 hours, preferably from about 0.5 to 6 hours, more preferably 0.5 to 3 hours. The graft reaction will be usually carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C. and one hour at 170° C., etc.

In the grafting process, usually the copolymer solution is first heated to grafting temperature and thereafter the grafting material and initiator are added with agitation, although they could have been added prior to heating. When the reaction is complete, the excess grafting material can be eliminated by an inert gas purge, e.g. nitrogen sparging. Preferably the grafting material that is added is kept below its solubility limit in the polymer solution, e.g. below about 1 wt. %, preferably below 0.4 wt. % or less, of grafting material based on the total weight of polymer-solvent solution, e.g. ethylene copolymer mineral lubricating oil solution. Continuous or periodic addition of the grafting material along with an appropriate portion of initiator, during the course of the reaction, can be utilized to maintain the carboxylic acid below its solubility limits, while still obtaining the desired degree of total grafting.

In the initiator grafting step the grafting material used may be grafted onto both the polymer and the solvent, particularly an oleaginous solvent such as oil, during the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, and also upon the maintenance of the grafting material in solution during the course of the reaction and minimizing the presence of dispersed, but undissolved grafting material The split between grafted oil and grafted polymer may be measured empirically from the infrared analyses of the product dialyzed into oil and polymer fractions.

The amount of grafting material used in the grafting reaction is an amount which is effective to provide a grafted ethylene-alpha-olefin copolymer exhibiting the properties of a multifunctional viscosity index improver, that is, a material having VI improving properties in an oleaginous composition and also having at least one additional property such as dispersancy, antioxidancy, etc. In the aspect of the instant invention wherein the grafted ethylene-alpha-olefin copolymer, preferably ethylene-alpha-olefin copolymer grafted with the monounsaturated carboxylic acid material of group 6, is further reacted with the polyamine containing at least one tertiary amino group and one primary amino group, the amount of grafting material used in the grafting reaction is an amount which upon further reaction of said grafted ethylene copolymer with said polyamine provides a material exhibiting the properties of a viscosity index improver-dispersant additive. Generally, this amount of grafting material, e.g., moles of carboxylic acid material such as maleic anhydride, is an amount which is effective to provide a grafted ethylene copolymer, e.g., ethylene-alpha-olefin substituted carboxylic acid material such as ethylene-propylene subtituted succinic anhydride, containing an average number of acid material moieties, e.g., succinic anhydride, grafted to or present on a 10,000 number average molecular weight segment of a mole of ethylene copolymer of at least about 0.1, preferably at least about 0.5, and more preferably at least about 1. The maximum average number of grafted moieties present per 10,000 average number molecular weight segment of a mole of ethylene copolymer backbone should not exceed about 10, preferably about 7 and more preferably about 5. Preferably, the average number, moles, of grafted moieties present per mole of ethylene copolymer backbone is at least about 0.6, preferably at least about 0.8, and more preferably at least about 1. Preferably, the maximum average number of grafted moieties grafted to or present per mole of ethylene copolymer backbone should generally not exceed about 10, preferably about 7, and more preferably about 5. Thus, for example, a mole of grafted ethylene copolymer, e.g., ethylene-propylene substituted succinic anhydride, containing an ethylene copolymer backbone such as an ethylene-propylene backbone having an average number molecular weight of 50,000 contains grafted to said backbone an average number of succinic anhydride moieties of from about 0.5 to about 50, preferably from about 0.6 to about 10. Typically, from about 0.2 to about 12, preferably from about 0.4 to about 6 moles of said carboxylic acid material are charged to the reactor per mole of ethylene copolymer charged.

Normally, not all of the ethylene copolymer reacts with the grafting material, e.g., maleic anhydride, to produce a grafted ethylene copolymer, e.g., ethylene-propylene substituted succinic anhydride. The resultant reaction product mixture, therefore, contains reacted or grafted ethylene copolymer, e.g., ethylene-propylene substituted succinic anhydride, unreacted or ungrafted ethylene copolymer, and unreacted grafting material, e.g., maleic anhydride. The unreacted ethylene copolymer is typically not removed from the reaction product mixture, and the reaction product mixture, generally stripped of any unreacted grafting material, is utilized as is or is employed for further reaction with the amine as described hereinafter.

Characterization of the average number of moles of grafting material such as carboxylic acid material, e.g., maleic anhydride, which have reacted per mole of ethylene copolymer charged to the reaction (whether it has undergone reaction or not) is defined herein as the average number of grafted moieties grafted to or present per mole of ethylene copolymer while the amount of unreacted ethylene copolymer present in the resulting reaction product mixture can be subsequently modified, i.e., increased or decreased by techniques known in the art, such modifications do not alter the average number of grafted moieties as defined above. The term grafted ethylene copolymer is intended to refer to the reaction product mixture whether it has undergone such modification or not.

These grafted ethylene-alpha-olefin copolymers, particularly those wherein the grafting material is an ethylenically monounsaturated mono- or dicarboxylic acid or anhydride or ester thereof as described supra, can further be reacted with a polyamine having one reactive primary amino group and preferably at least one tertiary amino group to provide a nitrogen containing, i.e., amide, imide or mixture thereof, grafted ethylene-alpha-olefin copolymer. Such imidated and/or amidated grafted ethylene-alpha-olefin copolymers exhibit not only viscosity index improving properties but additionally exhibit dispersant properties, i.e., they are multifunctional viscosity index improvers. Surprisingly, these imidated and/or amidated acid grafted ethylene-alpha-olefin copolymers have substantially the same or similar MWD as the ethylene-alpha-olefin copolymers and/or the grafted ethylene-alpha-olefin copolymers, and exhibit substantially the same or similar improved low temperature viscometric properties as the ethylene-alpha-olefin copolymers and/or the grafted ethylene-alpha-olefin copolymers.

Thus, another aspect of the instant invention is an imide and/or amide containing acid grafted ethylene-alpha-olefin copolymer useful as a multifunctional viscosity index improver comprising the reaction products of:

(i) grafted ethylene copolymer comprising reaction product of
  (a) copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ration of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; grafted at a temperature below about 225° C. with
  (b) ethylenically mono-unsaturated carboxylic acid material having 1 to 2 carboxylic acid groups or anhydride group; and reacted with
(ii) amine having one reactive primary amino group.

The grafting of the ethylenically mono-unsaturated mono- or dicarboxylic acid, anhydride or ester (i)(b) onto the ethylene-alpha-olefin copolymer (i)(a) is carried out under the mild grafting conditions as described hereinafore in order that the acid grafted ethylene-alpha-olefin copolymer has substantially the same or similar MWD as the ungrafted ethylene-alpha-olefin copolymer reactant (i). The grafted product (i) is then reacted with the amine (ii) to provide a nitrogen containing acid grafted ethylene-alpha-olefin copolymer.

It is critical that the amine reactant (ii) has only one primary amino group. If it contains more than one primary amino group, the MWD of the resultant product will be adversely affected, i.e., broadened.

The Amines

The amine reactants (ii) which are reacted with the grafted ethylene copolymer (i) to form the viscosity index improver-dispersant, i.e., multifunctional viscosity index improver, of the instant invention are amine compounds containing only one primary amine group. Preferably these amine compounds contain, in addition to the single primary amine group, at least one tertiary amine group and no secondary amino groups.

The mono-primary amine containing compounds of the present invention can broadly be represented by the formula R'—NH$_2$ where R' is an alkyl, a cycloalkyl, an aromatic, and combinations thereof, e.g., an alkyl substituted cycloalkyl. Furthermore, R' can be an alkyl, an aromatic, a cycloalkyl group, or combination thereof containing one or more tertiary amine groups therein. R' can also be an alkyl, a cycloalkyl, an aromatic group or combinations thereof containing one or more heteroatoms (for example oxygen, nitrogen, sulfur, etc.). R' can further be an alkyl, a cycloalkyl, an aromatic, or combinations thereof containing sulfide or oxy linkages therein.

Preferred primary amine containing compounds are those that, in addition to the single primary amine group, contain at least one tertiary amine group and no secondary amine groups, i.e., R' contains at least one tertiary amine group. These types of primary amine containing compounds may be referred to as polyamines.

These types of polyamines are well known in the art and some of said polyamines are disclosed, inter alia, in U.S. Pat. Nos. 3,239,658; 3,449,250 and 4,171,273, all of which are incorporated herein by reference.

These polyamines include those represented by the general formulae:

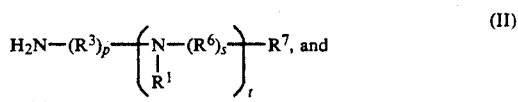

Generally R' contains from 1 to 50 carbon atoms, e.g., an alkyl containing from 1 to 50 carbon atoms, a cycloalkyl containing from 5 to about 12 ring carbon atoms, and an aromatic radical such as aryl, aralkyl or alkaryl containing from 6 to about 12 ring carbon atoms. wherein:

p is zero or one;
s is zero or one;
t is 1 to about 10;
R$^1$ and R$^2$ are independently selected from alkyl radicals, either straight chain or branched, containing from 1 to about 6 carbon atoms and cycloalkyl radicals containing from 4 to about 8 ring carbon atoms;
R$^3$ and R$^6$ are independently selected from unsubstituted or C$_1$-C$_6$ alkyl substituted alkylene radicals having from 1 to about 6 carbon atoms;
R$^4$ and R$^5$ are independently selected from unsubstituted, C$_1$-C$_6$ alkyl substituted, or Y substituted alkylene radicals containing from 1 to about 6 carbon atoms, or from unsubstituted, C$_1$-C$_6$ alkyl substituted, or Y substituted alkenylene radicals containing from 2 to about 6 carbon atoms;
R$^7$ is hydrogen, alkyl radical containing from 1 to about 6 carbons,

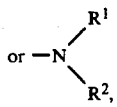

with the proviso that if a s is zero then R$^7$ is not hydrogen;
X$^1$ and X$^2$ are independently selected from —O—, —S—, NR$^1$, R$^3$, NY, or CHY radicals; and
Y is NH$_2$ or —R$^3$—NH$_2$;
with the proviso that the identities of groups X$^1$, X$^2$, R$^4$ and R$^5$ are selected to provide only one primary amine group and at least one tertiary amine per molecule of structural Formula III, i.e., the molecule of structural formula III contains one and only one Y group.

In compounds of Formula III it is generally preferred that $R^4$ and $R^5$ are alkylene rather than alkenylene radicals.

Some illustrative non-limiting examples of the mono-primary amine containing compounds include: N,N-dimethyl-1,2-ethylenediamine; N-methyl-N-ethyl-1,2-propylenediamine; N,N-dimethyl-1,3-propylenediamine; N,N-diethyl-1,3-propylenediamine; N,N-dipropyl-1,3-propylenediamine; N,N-diisopropyl-1,3-propylenediamine; N,N-dibutyl-1,3-propylenediamine; N,N-diisobutyl-1,3-propylenediamine; N,N-(di-t-butyl)-1,3-propylenediamine; N,N-dimethyl-N'-ethyl-1,3-propylenediamine; N,N-dimethyl-N'-butyl-1,3-propylenediamine; N,N-dimethyl-1,2-isopropylenediamine; N,N-dimethyl-1,4-butylenediamine; N,N-diethyl-2,3-butylenediamine; N,N-dimethyl-1,3-isobutylenediamine; N,N-dimethyl-1,3-butylenediamine; N,N-dimethyl-1,3-t-butylenediamine; N,N-dicyclohexyl-1,3-propylenediamine; N,N-dicyclohexyl-1,2-ethylenediamine, 2-aminopyridine, aminopyrazine, N-(3-aminopropyl) morpholine, N-(3-aminopropyl) imidazole and N-(2-aminoethyl)pyrrolidine, N,N-dimethylhydrazine, methylamine, ethylamine, butylamine, 2-methyoxyethylamine, 3-alkoxypropylamines wherein the alkoxy group contains from 1 to 18 carbon atoms, usually an alkoxy group having from 1 to 8 carbon atoms and has the formula $R''$—O—$CH_2CH_2C$—$H_2$—$NH_2$, such as 3-methoxypropylamine, 3-isobutyoxypropylamine and 3-(alkoxypoly ethoxy)-propylamines having the formula $R''O(CH_2C$—$H_2O)_x$—$CH_2CH_2CH_2NH_2$ wherein the alkoxy group is as immediately set forth above and where x is 1 to 50, 4,7-dioxaoctylamine, N-(3-aminopropyl)-$N^1$-methylpiperazine, N-(2-aminoethyl)piperazine, (2-aminoethyl)-pyridines, aminopyridines, 2-aminomethylpyridines, 2-aminomethylfuran, 3-amino-2-oxotetrahydrofuran, 2-aminomethypyrrolidine, 1-methyl-2-aminomethylpyrrolidine, 1-aminopyrrolidine, 1-(3-aminopropyl)-2-methypiperidine, 4-aminomethylpiperidine, N-(2-aminoethyl)morpholine, 1-ethyl-3-aminopiperidine, 1-aminopiperidine, N-aminomorpholine, and the like.

It is to be understood that only one amine compound can be reacted with the grafted ethylene copolymer or a mixture of two or more different amine compounds can be utilized.

Reaction of Grafted Ethylene Copolymer with Amine

The grafted ethylene copolymer, preferably in solution generally equal to about 5 to 30 wt. %, preferably 10 to 20 wt. % polymer, can be readily reacted with the polyamine (iii) by admixture and heating at a temperature of from about 100° C. to below about 225° C., preferably from 150° to below about 200° C., for from about 0.1 to 10 hours, usually about 0.1 to about 2 hours. The heating is preferably carried out to favor formation of imides rather than amides and salts. Thus, imide formation will give a lower viscosity of the reaction mixture than amide formation and particularly lower than salt formation. This lower viscosity permits the utilization of a higher concentration of grafted ethylene copolymer in the reaction mixture. Removal of water, e.g., by $N_2$ stripping during slow addition of amine with stirring, assures completion of the imidation reaction. Reaction ratios can vary considerably, depending upon the reactants, amounts of excess, type of bonds formed, etc. Generally, the amount of polyamine used is an amount which is effective or sufficient to provide from about 0.5 to about 2.5, preferably from about 0.8 to about 1.2 and more preferably from about 0.9 to about 1.0 equivalents of reactive primary amine moiety per acid equivalent of the grafted dicarboxylic acid moiety of the grafted ethylene copolymer (i), e.g., succinic anhydride.

The reaction of grafted ethylene copolymer with the polyamine is preferably carried out in the substantial absence of oxygen, e.g., under an inert atmosphere such as under a nitrogen blanket.

Further aspects of the present invention reside in the formation of metal complexes and other post-treatment derivatives, e.g., borated derivatives, of the grafted ethylene copolymers prepared in accordance with this invention. Suitable metal complexes may be formed in accordance with known techniques of employing a reactive metal ion species during or after, preferably after, the formation of the grafted ethylene copolymers of this invention. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. No. 3,306,908 and Re. 26,443, both incorporated herein by reference.

Post-treatment compositions include those formed by reacting the grafted ethylene copolymers of the present invention with one or more post-treating reagents, usually selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols, sulfur plus phenols, and carboxylic acid or anhydride acylating agents. The reaction of such posttreating agents with the grafted ethylene copolymers of this invention is carried out using procedures known in the art. For example, boration may be accomplished in accordance with the teaching of U.S. Pat. No. 3,254,025 by treating the copolymer of the present invention with a boron oxide, halide, ester or acid. Treatment may be carried out by adding about 1–3 wt % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

Since post-treating processes involving the use of these post-treating reagents are known insofar as application to conventional grafted ethylene copolymers of the prior art, detailed descriptions of these processes herein are unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936;

3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704; 3,551,466; 3,415,750; 3,312,619; 3,280,034; 3,718,663; 3,652,616; UK Pat. No. 1,085,903; UK Pat. No. 1,162,436; U.S. Pat. No. 3,558,743. The processes of these incorporated patents, as applied to the compositions of this invention, and the post-treated compositions thus produced constitute a further aspect of this invention.

A minor amount, e.g. 0.01 up to 49 wt %, based on the weight of the total composition, of the oil-soluble graft ethylene copolymers or nitrogen containing grafted ethylene copolymers produced in accordance with this invention can be incorporated into a major amount of an oleaginous material, such as a lubricating oil or hydrocarbon fuel, depending upon whether one is forming finished products or additive concentrates. The amount of the viscosity index improving or modifying grafted ethylene-alpha-olefin copolymer of the present invention present in an oleaginous composition such as a lubricating oil composition, e.g., fully formulated lubricating oil composition, is an amount which is effective to improve or modify the viscosity index of said oil composition, i.e., a viscosity improving effective amount. Generally, this amount is from about 0.001 to about 20 wt. %, preferably from about 0.01 to about 15 wt. %, and more preferably from about 0.1 to about 10 wt. %, based on the weight of the total composition.

The lubricating oils to which the products of this invention can be added include not only hydrocarbon oil derived from petroleum, but also include synthetic lubricating oils such as esters of dibasic acids; complex esters made by esterification of monobasic acids, polyglycols, dibasic acids and alcohols; polyolefin oils, etc.

The graft copolymers or nitrogen containing grafted ethylene copolymers of the invention may be utilized in a concentrate form, e.g., from about 2 wt % up to about 49 wt. %, preferably 3 to 25 wt. %, in oil, e.g., mineral lubricating oil, for ease of handling, and may be prepared in this form by carrying out the reaction of the invention in oil as previously discussed.

The above oil compositions may optionally contain other conventional additives, such as for example, pour point depressants, antiwear agents, antioxidants, other viscosity-index improvers, dispersants, corrosion inhibitors, anti-foaming agents, detergents, rust inhibitors, friction modifiers, and the like.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of about 66 to about 316° C. Neutralization of the phosphosulfurized hydrocarbon may be effected in the manner taught in U.S. Pat. No. 1,969,324.

Oxidation inhibitors, or antioxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, barium toctylphenyl sulfide, dioctylphenylamine, phenylalphanaphthylamine, phospho- sulfurized or sulfurized hydrocarbons, etc.

Other oxidation inhibitors or antioxidants useful in this invention comprise oil-soluble copper compounds. The copper may be blended into the oil as any suitable oil-soluble copper compound. By oil soluble it is meant that the compound is oil soluble under normal blending conditions in the oil or additive package. The copper compound may be in the cuprous or cupric form. The copper may be in the form of the copper dihydrocarbyl thio- or dithio-phosphates. Alternatively, the copper may be added as the copper salt of a synthetic or natural carboxylic acid. Examples of same thus include $C_{10}$ to $C_{18}$ fatty acids, such as stearic or palmitic acid, but unsaturated acids such as oleic or branched carboxylic acids such as napthenic acids of molecular weights of from about 200 to 500, or synthetic carboxylic acids, are preferred, because of the improved handling and solubility properties of the resulting copper carboxylates. Also useful are oil-soluble copper dithiocarbamates of the general formula $(RR,NCSS)nCu$ (where n is 1 or 2 and R and R, are the same or different hydrocarbyl radicals containing from 1 to 18, and preferably 2 to 12, carbon atoms, and including radicals such as alkyl, alkenyl, aryl, aralkyl, alkaryl and cycloaliphatic radicals. Particularly preferred as R and R, groups are alkyl groups of from 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R,) will generally be about 5 or greater. Copper sulphonates, phenates, and acetylacetonates may also be used.

Exemplary of useful copper compounds are copper CuI and/or CuII salts of alkenyl succinic acids or anhydrides. The salts themselves may be basic, neutral or acidic. They may be formed by reacting (a) polyalkylene succinimides (having polymer groups of $\overline{M}_n$ of 700 to 5,000) derived from polyalkylene-polyamines, which have at least one free carboxylic acid group, with (b) a reactive metal compound. Suitable reactive metal compounds include those such as cupric or cuprous hydroxides, oxides, acetates, borates, and carbonates or basic copper carbonate.

Examples of these metal salts are Cu salts of polyisobutenyl succinic anhydride, and Cu salts of polyisobutenyl succinic acid. Preferably, the selected metal employed is its divalent form, e.g., Cu+2. The preferred substrates are polyalkenyl succinic acids in which the alkenyl group has a molecular weight greater than about 700. The alkenyl group desirably has a $\overline{M}_n$ from about 900 to 1,400, and up to 2,500, with a $\overline{M}_n$ of about 950 being most preferred. Especially preferred is polyisobutylene succinic anhydride or acid. These materials may desirably be dissolved in a solvent, such as a mineral oil, and heated in the presence of a water solution (or slurry) of the metal bearing material. Heating may take place between 70° and about 200° C. Temperatures of 110° C. to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-polyisobutenyl succinic anhydride, Cu-oleate, or mixtures thereof) will be generally employed in an amount of from about 50 to 500 ppm by weight of the metal, in the final lubricating or fuel composition.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N(hydroxyalkyl)alkenyl-succinamic acids or succinimides; U.S. Pat. No. 3,932,290 which discloses reaction products of di- (lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis-alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinimides, the reaction product of oil-soluble polyisobutylene succinic anhydride with ethylene amines such as tetraethylene pentamine and borated salts thereof.

Pour point depressants, otherwise known as lube oil flow improvers, lower the temperature at which the fluid will flow or can be poured. Such additives are well known. Typically of those additives which usefully optimize the low temperature fluidity of the fluid are $C_8$-$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and dicarboxylic acids. Highly basic (viz, overbased) metal sales, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Additive | Wt. % a.i. (Broad) | Wt. % a.i. (Preferred) |
| --- | --- | --- |
| Viscosity Modifier | .01–12 | .01–4 |
| Corrosion Inhibitor | 0.01–5 | .01–1.5 |
| Oxidation Inhibitor | 0.01–5 | .01–1.5 |
| Dispersant | 0.1–20 | 0.1–8 |
| Pour Point Depressant | 0.01–5 | .01–1.5 |
| Anti-Foaming Agents | 0.001–3 | .001–0.15 |
| Anti-Wear Agents | 0.001–5 | .001–1.5 |
| Friction Modifiers | 0.01–5 | .01–1.5 |
| Detergents/Rust Inhibitors | .01–10 | .01–3 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to here in as an additive package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the products of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (a.i.) content of the additive, and/or upon the total weight of any additive-package, or formulation which will be the sum of the a.i. weight of each additive plus the weight of total oil or diluent.

As mentioned hereinafore grafted ethylene copolymers of the present invention are particularly useful as fuel and lubricating oil additives.

The grafted ethylene copolymers of this invention find their primary utility, however, in lubricating oil compositions, which employ a base oil in which these copolymers are dissolved or dispersed.

Thus, base oils suitable for use in preparing the lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalpha-olefins, polybutenes, alkyl benzenes, organic esters of phosphoric acids, polysilicone oils, etc.

The grafted ethylene copolymers of the instant invention are oil-soluble, dissolvable in oil with the aid of a suitable solvent, or are stably dispersible therein. Oil-soluble, dissolvable, or stably dispersible as that terminology is used herein does not necessarily indicate that the materials are soluble, dissolvable, miscible, or capable of being suspended in oil in all proportions. It does mean, however, that the additives for instance, are soluble or stably dispersible in oil to an extent sufficient to exert their intended effect in the environment in which the oil is employed. Moreover, the additional incorporation of other additives may also permit incorporation of higher levels of a particular copolymer hereof, if desired.

Accordingly, while any effective amount, i.e., viscosity index improving or viscosity index improving-dispersant effective amount, of the additives of the present invention can be incorporated into the fully formulated lubricating oil composition, it is contemplated that such effective amount be sufficient to provide said lube oil composition with an amount of the additive of typically from about 0.001 to about 20, preferably 0.01 to 15, more preferably from 0.1 to about 10 and most preferably from about 0.25 to about 5 wt. %, based on the weight of said composition.

The following examples further illustrate the present invention. The examples are presented by way of illustration and do not limit the invention thereto. Unless otherwise indicated, all parts and percentages are on a weight basis.

EXAMPLE 1

An ethylene-propylene copolymer having an ethylene content of about 56 wt. %, an $\overline{M}_w$ of about 105,000, an $\overline{M}_n$ of about 96,000, and a $\overline{M}_w/\overline{M}_n$ of 1.094 is prepared in a tubular reactor under the following conditions:

| | |
|---|---|
| Reactor Inlet Temp. (°F.) | −4 |
| Reactor Outlet Temp. (°F.) | 57 |
| Sidestream Feed Temp. (°F.) | −26 |
| Catalyst Premix Temp. (°F.) | 91 |
| Catalyst Premix Time (Sec.) | 7.87 |
| Reactor Residence Time (Sec.) | 1.26/1.40 |
| at Sidestream 1/2 | |
| Inlet Feed Rates (Klb./hr.) | |

| -continued | |
|---|---|
| Hexane | 164.8 |
| Ethylene | 1.03 |
| Propylene | 15.36 |
| VCl$_4$ | 0.03375 |
| Al$_2$(C$_2$H$_5$)$_3$Cl$_3$ | 0.861 |
| Sweep Hexane | 4.926 |
| Sidestream Feed Rates (Klb./hr.) | |
| Hexane | 25.0 |
| Ethylene | 3.02 |
| Propylene | 5.84 |
| Total Hexane (Klb./hr.) | 194.7 |
| Sidestream Feed Splits (wt. %) | 70/30 |
| Sidestream 1/2 | |

EXAMPLE 2

700 grams of a 15 wt. % solution in S100 NLP baseoil of a copolymer prepared in accordance with the procedure of Example 1 were introduced into a 1-liter reactor and heated to 175° C. with nitrogen purge. 17.5 grams of maleic anhydride are charged to the reactor in 10 stages, each stage consisting of 1.75 grams of maleic anhydride. After each charge of maleic anhydride, 0.28 gram of di-t-butyl peroxide was charged to the reactor as initiator for the free radical grafting reaction. After the last charge of di-t-butyl peroxide was introduced into the reactor, the reaction mixture was soaked for 15 minutes and then the residual unreacted maleic anhydride was stripped off with nitrogen for one hour. The total acidity of the reaction mixture was determined to be 0.14 meq./g. The $\overline{M}_w$ and $\overline{M}_n$ of the grafted copolymer were determined by GPC and were found to be 101,000 ($\overline{M}_w$), 87,000 ($\overline{M}_n$) The of this grafted copolymer was determined to be 1.160.

As seen by a comparison of the $\overline{M}_w/\overline{M}_n$ of the copolymer of Example 1 with the $\overline{M}_w/\overline{M}_n$ of the grafted copolymer of Example 2, the $\overline{M}_w/\overline{M}_n$ of the two differs by 0.066, i.e., 6%. Thus, the MWD of the copolymer of Example 1 has not been substantially deleteriously affected (broadened) during grafting to produce the grafted copolymer of Example 2.

COMPARATIVE EXAMPLE 3

The procedure of Example 2 is repeated except that the 700 grams of the 15 wt. % solution of a copolymer prepared in accordance with the procedure of Example 1 were replaced with 700 grams of a 15 wt. % solution in S100 NLP baseoil of a conventional ethylene-propylene copolymer falling outside the scope of the instant invention having an $\overline{M}_n$ of 41,000, an $\overline{M}_w$ of 120,000, an $\overline{M}_w/\overline{M}_n$ of 2.9, a $\overline{M}_z/\overline{M}_w$ of 2.4, and having an ethylene content of about 424 wt. %.

COMPARATIVE EXAMPLE 4

A lubricating oil composition containing a standard detergent inhibitor package and 5 wt. % of the reaction product of Example 2 was formulated to standard 10W40 specification by adding said reaction product of Example 2 to said oil composition. The Kinematic viscosity at 100° C., CCS viscosity at −20° C., Mini Rotary Viscometer (MRV) viscosity, and TP-1 viscosity at −25° C. of the fully formulated oil composition were determined and the results are set forth in Table I.

MRV (Mini Rotary Viscometer), using a technique described in ASTM-D3829, measures viscosity in centipoise. MRV was determined at −25° C.

CCS (Cold Cranking Simulator), using a technique described in ASTM-D2602, is a high shear viscosity measurement in centipoise. This test is related to a lubricating oil's resistance to cold engine starting.

TP-1, is determined using a technique described in ASTM-D4684. This is essentially the same as the MRV noted above, except that a slow cooling cycle is used. The cycle is defined in SAE Paper No. 850443, K. 0. Henderson et al.

COMPARATIVE EXAMPLE 5

The procedure of Example 4 is repeated except that the 5 wt. % of the reaction product of Example 2 is replaced with 5 wt. % of the reaction product of Comparative Example 3. The Kinematic viscosity at 100.C, CCS viscosity at −20° C., MRV viscosity, and the TP-1/viscosity at −25° C. of the fully formulated oil composition were determined and the results are set forth in Table I.

TABLE 1

| Example No. | Kinematic viscosity (Centistokes) | CCS viscosity (Centipoise) | MRV viscosity (Centipoise) | TP-1 viscosity (Centipoise) |
|---|---|---|---|---|
| Example 4 | 14.49 | 3711 | 17,500 | 15,645 |
| Comparative Example 5 | 14.35 | 3641 | 27,717 | 23,424 |

As illustrated by the data in Table 1 the acid grafted ethylene-propylene copolymer of the instant invention (Example 4) when incorporated into lubricating oil provides lubricating oil composition exhibiting similar high temperature viscometric properties (Kinematic viscosity at 100° C.) as a lubricating oil composition containing a conventional ethylene-propylene copolymer viscosity index modifier falling outside the scope of the instant invention (Comparative Example 5) and improved low temperature viscometric properties (MRV and TP-1) as compared with said conventional viscosity index modifier containing lubricating oil composition. The CCS, MRV and TP-1 are indicative of low temperature properties of lubricating oils.

The following examples further illustrate the grafted ethylene-propylene copolymers of the instant invention.

EXAMPLE 6

Into a reactor vessel are charged 700 grams of a 15 wt. % solution of the ethylene-propylene copolymer described in Example 1 in S100NLP mineral oil. This solution is heated to 175° C. with nitrogen purge. To this heated solution are charged 13.17 grams of vinyl acetate in 10 stages, each stage comprising about 1.31 grams of vinyl acetate. After each vinyl acetate charge 0.28 grams of di-t-butyl peroxide are charged to the reaction mixture as initiator for the grafting reaction. After the last charge of di-t-butyl peroxide is added to the reactor, the reaction mixture is soaked for 15 minutes and then the residual unreacted vinyl acetate is stripped with nitrogen for one hour.

EXAMPLE 7

Into a reactor vessel are charged 700 grams of a 15 wt. % solution of the ethylene-propylene copolymer described in Example 1 in S100NLP mineral oil. This solution is heated to 175° C. with nitrogen purge. To heated solution are charged 17.8 grams of ethyl acrylate in 10 stages, each stage comprising about 1.78 grams of ethyl acrylate. After each ethyl acrylate charge 0.28 grams of di-t-butyl peroxide are charged to the reaction mixture as initiator for the grafting reaction. After the last charge of di-t-butyl peroxide is added to the reactor, the reaction mixture is soaked for 15 minutes and then the residual unreacted ethyl acrylate is stripped with nitrogen for one hour.

EXAMPLE 8

Into a reactor vessel are charged 700 grams of a 15 wt. % solution of the ethylene-propylene copolymer described in Example 1 in S100NLP mineral oil. This solution is heated to 175° C. with nitrogen purge. To this heated solution are charged 11.36 grams of methyl vinylether in 10 stages, each stage comprising about 1.13 grams of methyl vinylether. After each methyl vinylether charge 0.30 grams of di-t-butyl peroxide are charged to the reaction mixture as initiator for the grafting reaction. After the last charge of di-t-butyl peroxide is added to the reactor, the reaction mixture is soaked for 15 minutes and then the residual unreacted methyl vinylether is stripped with nitrogen for one hour.

EXAMPLE 9

Into a reactor vessel are charged 700 grams of a 15 wt. % solution of the ethylene-propylene copolymer described in Example 1 in S100NLP mineral oil. This solution is heated to 175° C. with nitrogen purge. To this heated solution are charged 17.8 grams of N-vinyl pyrrolidone and 2.8 grams of di-t-butyl peroxide. The reaction mixture is soaked for 15 minutes and then the residual unreacted N-vinyl pyrrolidone is stripped with nitrogen for one hour.

EXAMPLE 10

Into a reactor vessel are charged 700 grams of a 15 wt. % solution of the ethylene-propylene copolymer described in Example 1 in S100NLP mineral oil. This solution is heated to 175° C. with nitrogen purge. To this heated solution are charged 16.8 grams of 2-vinylpyridine and 3 grams of di-t-butyl peroxide. The reaction mixture is soaked for 15 minutes and then the residual unreacted 2-vinylpyridine is stripped with nitrogen for one hour.

EXAMPLE 11

Into a reactor vessel are charged 700 grams of a 15 wt. % solution of the ethylene-propylene copolymer described in Example 1 in S100NLP mineral oil. This solution is heated to 175° C. with nitrogen purge. To this heated solution are charged 11.1 grams of acrylic acid and 2.5 grams of di-t-butyl peroxide. The reaction mixture is soaked for 15 minutes and then the residual unreacted acrylic acid is stripped with nitrogen for one hour.

EXAMPLE 12

Into a reactor vessel are charged 1500 grams of a 5 wt. % solution of the ethylene propylene copolymer described in Example 1 in S100NLP mineral oil. This solution is heated to 175° C. with nitrogen purge. The temperature is then reduced to 80° C. and 22.5 grams of methyl acrylate and 11.25 grams of maleic anhydride are added over a period of 15 minutes. After an additional hour, 1.32 grams of t-butyl perbenzoate are added. The solution is then stirred at 80° C. for 30 minutes, followed 10 rapid heating to 140° C. An additional 1.32 grams of t-butyl perbenzoate are then added and stirring is continued at 140° C. for one hour.

EXAMPLE 13

Into a reactor vessel are charged 220 grams of a 5 wt. % solution of the ethylene-propylene copolymer described in Example 1 in S100NLP mineral oil. This solution is heated to 120° C. under nitrogen. T-butyl peroctoate, 0.33 grams, is dissolved in 4 ml. of o-dichlorobenzene, and one ml. of this initiator solution is added to the reactor vessel. To this reaction mixture are added 3.3 grams of N,N-dimethylaminoethyl methacrylate. Three additional increments of initiator solution are added in twenty-minute intervals. Heating, at 120° C., is continued for one hour.

EXAMPLE 14

Into a reactor vessel are charged 220 grams of a 5 wt. % solution of the ethylene-propylene copolymer described in Example 1 in S100NLP mineral oil. This solution is heated to 120° C. under nitrogen. T-butyl peroctoate, 0.33 grams, is dissolved in 4 ml. of o-dichlorobenzene, and one ml. of this initiator solution is added to the reactor vessel. To this reaction mixture are added 2.2 grams of acrylonitrile. Three additional increments of initiator solution are added in twenty-minute intervals. Heating, at 120° C., is continued for one hour.

The following examples illustrate the nitrogen, e.g., imide, containing grafted ethylene-propylene copolymers of the instant invention comprising the reaction products of an ethylene-propylene copolymer of the instant invention grafted with maleic anhydride and reacted with an amine containing one primary amino group and at least one tertiary amino group.

EXAMPLE 15

250 grams of a 15 wt. % solution in S100NLP baseoil of a copolymer prepared in accordance with the procedure of Example 1 were charged into a ½ liter reactor vessel and heated to 175° C. with nitrogen sparging. 6.25 grams (2.5 wt. % based on copolymer solution) of maleic anhydride were charged to the reactor in 10 stages of 0.625 grams per each stage. Five minutes after each maleic anhydride charge 0.1 gram of di-t-butyl peroxide was added to the reactor vessel as the initiator for the free radical grafting reaction. After the addition of the last di-t-butyl peroxide charge the reaction mixture was sparged with nitrogen for 2 hours. The total acidity of the succinic anhydride grafted ethylene-propylene copolymer was determined to be 0.135 meq./g. 250 grams of this grafted copolymer product were then placed in a ½ liter reactor and heated to 175° C. under nitrogen atmosphere. 14.25 grams of N-aminipropylmorpholine were added to the reactor. After 10 minutes soak time at 175° C., the residual unreacted N-aminipropylmorpholine was stripped off with nitrogen. The nitrogen containing grafted ethylene-propylene copolymer had a Shear Stability Index of 21.4%.

Shear stability index (SSI) measures the mechanical stability of polymers used as V.I. improvers in crankcase lubricants subjected to high strain rates. The diesel fuel injector test was used (CEC L-14-A-79, equivalent to DIN 51382). To determine SSI, the polymer under test is dissolved in a suitable base oil (for example, a solvent extracted 150 neutral) to a relative viscosity of 2 to 3 at 100° C. The oil solution is then circulated through a diesel fuel injector, for a total of thirty passes. The SSI is calculated from the initial 100° C. kinematic viscosity (Vi), the final kinematic viscosity (Vf), and the base oil viscosity (Vb), as SSI $(\%) = 100 \times (V_i - V_f)/(V_i - V_b)$. A reference sample (as required by the DIN method) is used to calibrate the test. The SSI is indicative of the resistance of a polymer to molecular weight degradation by shearing forces. The higher the SSI the less stable the polymer, i.e., the more susceptible it is to molecular weight distribution.

EXAMPLE 16

A lubricating oil composition formulated to 10W40 specifications containing a standard detergent inhibitor package and 12.0 wt. % of the nitrogen containing grafted ethylene-propylene copolymer reaction product prepared in accordance with the procedure of Example 15 was prepared by adding said reaction product to said oil composition. The Kinematic viscosity at 100° C., CCS viscosity at $-20°$ C., MRV viscosity at $-25°$ C., and TP-1 viscosity at $-25°$ C. of this fully formulated oil composition were determined, and the results are set forth in Table 2.

COMPARATIVE EXAMPLE 17

The procedure of Example 15 was repeated except that the 15 wt. % solution in S100NLP baseoil of a copolymer prepared in accordance with the procedure of Example 1 were replaced with a 15 wt. % solution in S100NLP baseoil of a conventional ethylene-propylene copolymer falling outside the scope of the instant invention having a $\overline{M}_n$ of 41,000, a $\overline{M}_w$ of 120,000, an $\overline{M}_w/\overline{M}_n$ of 2.9, a $\overline{M}_z/\overline{M}_w$ of 2.4, and having an ethylene content of about 42 wt. %. The nitrogen containing grafted ethylene-propylene copolymer had a Shear Stability Index of 28%.

COMPARATIVE EXAMPLE 18

The procedure of Example 16 was repeated except that the nitrogen containing grafted ethylene copolymer reaction product prepared in accordance with the procedure of Example 15 is replaced with the nitrogen containing grafted ethylene copolymer prepared in accordance with the procedure of Comparative Example 16. The Kinematic viscosity at 100° C., CCS viscosity at $-20°$ C., MRV viscosity at $-25°$ C., and TP-1 viscosity at $-25°$ C. of this fully formulated oil composition were determined, and the results are set forth in Table 2.

TABLE 2

| Example No. | Kinematic viscosity (Centistokes) | CCS viscosity (Centipoise) | MRV viscosity (Centipoise) | TP-1 viscosity (Centipoise) |
|---|---|---|---|---|
| Example 16 | 13.9 | 3444 | 14,074 | 12,336 |
| Comparative Example 5 | 14.7 | 4283 | 29,086 | 28,798 |

Comparison of the Shear Stability Index of the nitrogen containing grafted ethylene-propylene copolymer of the instant invention (Example 15) with the Shear Stability Index of the conventional nitrogen containing grafted ethylene-propylene copolymer falling outside the scope of the instant invention (Comparative Example 17) clearly shows that the imidated ethylene-propylene copolymer of the instant invention exhibits better shear stability than the imidated ethylene-propylene copolymer falling outside the scope of the instant invention. Moreover, the data in Table 2 illustrates that oil compositions containing the imidated ethylene-propylene copolymers of the instant invention (Example 16)

exhibit better low temperature properties than oil compositions containing the conventional imidated ethylene-propylene copolymer falling outside the scope of the instant invention (Comparative Example 18).

What is claimed is:

1. Composition of matter useful as a viscosity index improver additive for oleaginous compositions comprising:
   (i) backbone copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; having grafted on said backbone copolymer
   (ii) residue of at least one ethylenically unsaturated grafting material selected from the group consisting of
   (a) esters of unsaturated alcohols;
   (b) esters of saturated alcohols with unsaturated acids;
   (c) unsaturated ethers;
   (d) unsaturated ketones;
   (e) unsaturated, polar nitrogen-containing hydrocarbon compounds;
   (f) unsaturated carboxylic acid materials;
   (g) maleic acid or anhydride and one or more other monomers copolymerizable therewith;
   (h) methacrylates and acrylates, both monomeric and polymeric; and
   (i) oxygen- or sulfur-containing vinyl heterocyclic compounds; and mixtures thereof; said grafted ethylene-alpha-olefin copolymer having a molecular weight distribution which does not differ from the molecular weight distribution of said copolymer of ethylene by more than about 10%.

2. The composition of matter according to claim 1 wherein said grafting material is an unsaturated carboxylic acid material selected from ethylenically monounsaturated $C_4$ to $C_4$ dicarboxylic acids or anhydrides.

3. The composition of matter according to claim 2 wherein the unsaturated carboxylic acid material is maleic acid or anhydride.

4. The composition of matter according to claim 1, wherein said backbone copolymer (i) has an intermolecular compositional dispersity such that 95 weight % of said copolymer chains have a composition 15 weight % or less different from said average ethylene composition.

5. The composition of matter according to claim 4, wherein said intermolecular compositional dispersity of said backbone copolymer (i) is such that 95 weight % of said copolymer chains have a composition 10 wt. % or less different from said average ethylene composition.

6. The composition of matter according to claim 5, wherein said low crystallinity segment comprises from about 20 to 53 wt. % ethylene.

7. The composition of matter according to claim 6, wherein said crystallizable segment comprises at least about 57 wt. % ethylene.

8. The composition of matter according to claim 7, wherein said backbone copolymer (i) is characterized by a weight-average molecular weight of from about 2,000 to about 12,000,000.

9. The composition of matter according to claim 1, wherein said backbone copolymer (i) has a MWD characterized by at least one of a ratio of $\overline{M}_w/\overline{M}_n$ of less than about 1.5 and a ratio of $\overline{M}_z/\overline{M}_w$ of less than about 1.5.

10. The composition of matter according to claim 9, wherein said backbone copolymer (i) has a MWD characterized by at least one of a ratio of $\overline{M}_w/\overline{M}_n$ of less than about 1.25 and a ratio of $\overline{M}_z/\overline{M}_w$ of less than about 1.2.

11. The composition of matter according to claim 9, wherein said intermolecular compositional dispersity of said backbone copolymer (i) is such that 95 weight % of said copolymer chains have a composition 13 weight % or less different from said average ethylene composition.

12. The composition of matter according to claim 9, wherein said low crystallinity segment of said backbone copolymer (i) comprises from about 30 to 50 weight % ethylene.

13. The composition of matter according to claim 1, wherein said backbone copolymer (i) has a total minimum ethylene content of about 20 % on a weight basis.

14. The composition of matter according to claim 13, wherein said backbone copolymer (i) has a MWD characterized by at least one of a ratio of $\overline{M}_w/\overline{M}_n$ of less than about 1.5 and a ratio of $\overline{M}_z/\overline{M}_w$ of less than about 1.5.

15. The composition of matter according to claim 14, wherein said backbone copolymer (i) has a MWD characterized by at least one or a ratio of $\overline{M}_w/\overline{M}_n$ of less than about 1.25 and a ratio of $\overline{M}_z/\overline{M}_w$ of less than about 1.2.

16. The composition of matter according to claim 15, wherein said backbone copolymer (i) has a MWD characterized by both a ratio of $\overline{M}_w/\overline{M}_n$ of less than about 1.25 and a ratio of $\overline{M}_z/\overline{M}_w$ of less than about 1.2.

17. The composition of matter according to claim 1, wherein said backbone copolymer's (i) chain segment sequences are characterized by at least one of the structures:

$$M—T \qquad (I)$$

$$T^1—(M—T^2)_x \qquad (II)$$

$$T^1—(M^1—T^2)_y—M^2 \qquad (III)$$

wherein x and y are each integers of 1 to 3, M comprises said crystallizable segment, T comprises said low crystallinity segment, $M^1$ and $M^2$ are the same or different and each comprises an M segment, and $T^1$ and $T^2$ are the same or different and each comprises a T segment.

18. The composition of matter according to claim 17, wherein said backbone copolymer's (i) segment sequences are characterized by structure I.

19. The composition of matter according to claim 17, wherein said backbone copolymer's (i) chain segment sequences are characterized by structure II.

20. The composition of matter according to claim 19, wherein x is one.

21. The composition of matter according to claim 20, wherein in said backbone copolymer (i) said $T^1$ and $T^2$ segments are of about the same weight-average molecular weight.

22. The composition of matter according to claim 21, wherein in said backbone copolymer (i) the sum of the weight average molecular weights of said $T^1$ and $T^2$ segments is substantially equal to the weight-average molecular weight of said M segment.

23. The composition of matter according to claim 1 wherein said backbone copolymer (i) has a total ethylene content of greater than about 35% on a weight basis.

24. A lubricant composition exhibiting improved low temperature viscometric properties comprising (1) lubricating oil and (2) a viscosity index improving effective amount of a composition of matter comprising
  (i) backbone copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}w/\overline{M}n$ of less than 2 and a ratio of $\overline{M}z/\overline{M}w$ of less than 1.8, and wherein at least two portions of an individual intramolecularly heterogeneous chain, each portion comprising at least 5 weight percent of said chain, differ in composition from one another by at least 7 weight percent ethylene; having grafted on said backbone copolymer
  (ii) residue of at least one ethylenically unsaturated grafting material selected from the group consisting of
    (a) esters of unsaturated alcohols;
    (b) esters of saturated alcohols with unsaturated acids;
    (c) unsaturated ethers;
    (d) unsaturated ketones;
    (e) unsaturated, polar nitrogen-containing hydrocarbon compounds;
    (f) unsaturated carboxylic acid materials;
    (g) maleic acid or anhydride and one or more other monomers copolymerizable therewith;
    (h) methacrylates and acrylates, both monomeric and polymeric; and
    (i) oxygen- or sulfur-containing vinyl heterocyclic compounds; and mixtures thereof; said grafted ethylene-alpha-olefin copolymer having a molecular weight distribution which does not differ from the molecular weight distribution of said copolymer of ethylene by more than about 10%.

25. Composition of matter useful as a multifunctional viscosity index improver additive for oleaginous composition comprising reaction product of:
  (1) copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}w/\overline{M}n$ of less than 2 and a ratio of $\overline{M}z/\overline{M}w$ of less than 1.8, and wherein at least two portions of an individual intramolecularly heterogeneous chain, each portion comprising at least 5 weight percent of said chain, differ in composition from one another by at least 7 weight percent ethylene; grafted with
  (ii) ethylenically unsaturated carboxylic acid having 1 to 2 carboxylic acid groups or anhydride group; wherein the grafted product of (i) and (ii) has a molecular weight distribution which does not differ from the molecular weight distribution of said copolymer of ethylene by more than about 10% and wherein said grafted product is reacted with
  (iii) at least one polyamine having one reactive primary amine group and at least one tertiary amine group.

26. The composition according to claim 25, wherein said copolymer (i) has an intermolecular compositional dispersity such that 95 weight % of said copolymer chains have a composition 15 weight % or less different from said average ethylene composition.

27. The composition according to claim 26, wherein said intermolecular compositional dispersity of said copolymer (i) is such that 95 weight % of said copolymer chains have a composition 10 wt. % or less different from said average ethylene composition.

28. The composition according to claim 26, wherein said low crystallinity segment comprises from about 20 to 53 wt. % ethylene.

29. The composition according to claim 28, wherein said crystallizable segment comprises at least about 57 wt. ethylene.

30. The composition according to claim 29, wherein said copolymer (i) is characterized by a weight-average molecular weight of from about 2,000 to about 12,000,000.

31. The composition according to claim 28, wherein said low crystallinity segment of said copolymer (i) comprises from about 30 to 50 weight % ethylene.

32. The composition according to claim 25, wherein said copolymer (i) has a MWD characterized by at least one of a ratio of $\overline{M}_w/\overline{M}_n$ of less than about 1.5 and a ratio of $\overline{M}_z/\overline{M}_w$ less than about 1.5.

33. The composition according to claim 32, wherein said copolymer (i) has a MWD characterized by at least one of a ratio of $\overline{M}_w/\overline{M}_n$ of less than about 1.25 and a ratio of $\overline{M}_z/\overline{M}_w$ less than about 1.2.

34. The composition according to claim 32 wherein said intermolecular compositional dispersity of said copolymer (i) is such that 95 weight % of said copolymer chains have a composition 13 weight % or less different from said average ethylene composition.

35. The composition according to claim 25, wherein said copolymer (i) has a total minimum ethylene content of about 20 % on a weight basis.

36. The composition according to claim 25, wherein said copolymer's (i) chain segment sequences are characterized by at least one of the structures:

$$M-T \qquad (I)$$

$$T^1-(M-T^2)_x \qquad (II)$$

$$T^1-(M^1-T^2)_y-M^2 \qquad (III)$$

wherein x and y are each integers of 1 to 3, M comprises said crystallizable segment, T comprises said low crystallinity segment, $M^1$ and $M^2$ are the same or different and each comprises an M segment, and $T^1$ and $T^2$ are the same or different and each comprises a T segment.

37. The composition according to claim 36, wherein said copolymer's (i) segment sequences are characterized by structure I.

38. The composition according to claim 36, wherein said copolymer's (i) chain segment sequences are characterized by structure II.

39. The composition according to claim 36, wherein x is one.

40. The composition according to claim 39, wherein in said copolymer (i) said $T^1$ and $T^2$ segments are of about the same weight-average molecular weight.

41. The composition according to claim 40, wherein in said copolymer (i) the sum of the weight average molecular weights of said $T^1$ and $T^2$ segments is about equal to the weight-average molecular weight of said M segment.

42. The composition according to claim 36, wherein said copolymer (i) has a MWD characterized by at least one of a ratio of $\overline{M}_w/\overline{M}_n$ of less than about 1.5 and a ratio of $\overline{M}_z/\overline{M}_w$ of less than about 1.5.

43. The composition according to claim 42, wherein said copolymer (i) has a MWD characterized by at least one or a ratio of $\overline{M}_w/\overline{M}_n$ of less than about 1.25 and a ratio of $\overline{M}_z/\overline{M}_w$ less than about 1.2.

44. The composition according to claim 43, wherein said copolymer (i) has a MWD characterized by both a ratio of $\overline{M}_w/\overline{M}_n$ of less than about 1.25 and a ratio of $\overline{M}_z/\overline{M}_w$ of less than about 1.2.

45. The composition according to claim 25, wherein said copolymer (i) has a total ethylene content of greater than about 35% on a weight basis.

46. The composition according to claim 25, (ii) is selected from the group consisting of maleic acid and maleic anhydride.

47. The composition according to claim 46, wherein (ii) is maleic anhydride.

48. The composition according to claim 25, wherein polyamine (iii) is selected from polyamines represented by the formulae

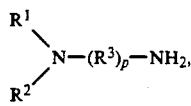 (I)

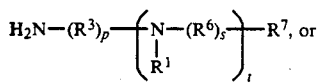 (II)

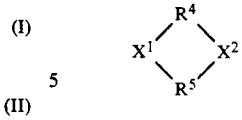 (III)

wherein:
p is zero or one;
s is zero or one;
t is 1 to about 10;
$R^1$ and $R^2$ are independently selected from alkyl radicals, either straight chain or branched, containing from 1 to about 6 carbon atoms and cycloalkyl radicals containing from 4 to about 8 ring carbon atoms;
$R^3$ and $R^6$ are independently selected from unsubstituted or $C_1$-$C_6$ alkyl substituted alkylene radicals having from 1 to about 6 carbon atoms;
$R^4$ and $R^5$ are independently selected from unsubstituted, $C_1$-$C_6$ alkyl substituted, or Y substituted alkylene radicals containing from 1 to about 6 carbon atoms, or from unsubstituted, $C_1$-$C_6$ alkyl substituted, or Y substituted alkenylene radicals containing from 2 to about 6 carbon atoms;
$R^7$ is hydrogen, alkyl radical containing from 1 to about 6 carbons, or 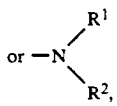

with the proviso that if s is zero $R^7$ is not hydrogen;
$X^1$ and $X^2$ are independently selected from —O—, —S—, NR, $R^3$, NY, or CHY radicals; and
Y is —$NH_2$ or —$R^{3\,l}$—$NH_2$;
with the proviso that the identities of groups $X^1$, $X^2$, $R^4$ and $R^5$ are selected to provide only one primary amine group and at least one tertiary amine per molecule of structural Formula III.

49. The composition according to claim 25, wherein ethylene copolymer (i) is grafted with mono-ethylenically unsaturated mono- or dicarboxylic acid material (ii) in a solvent in the presence of free radical grafting initiator.

50. The composition according to claim 49, wherein said solvent is mineral oil.

51. The composition according to claim 49, wherein (ii) is monoethylenically unsaturated $C_4$ to $C_{10}$ dicarboxylic acid material.

52. The composition according to claim 51, wherein (ii) is maleic anhydride, maleic acid, or mixtures thereof.

53. The composition according to claim 52 wherein (iii) is N-aminopropyl-morpholine.

54. A lubricating composition exhibiting improved low temperature viscometric properties and dispersancy comprising:
(1) lubricating oil, and
(2) multifunctional viscosity index improver comprised of reaction product of
(1) copolymer of ethylene and at least one other alpha-olefin monomer, said copolymer comprising intramolecularly heterogeneous copolymer chains containing at least one crystallizable segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized by at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; grafted with (ii) ethylenically unsaturated carboxylic acid having 1 to 2 carboxylic acid groups or anhydride group; wherein the grafted product of (i) and (ii) has a molecular weight distribution which does not differ from the molecular weight distribution of said copolymer of ethylene by more than about 10% and wherein said grafted product is reacted with (iii) at least one polyamine having one reactive primary amine group and at least one tertiary amine group.

55. The composition according to claim 54, wherein said copolymer (i) has an intermolecular compositional dispersity such that 95 weight % of said copolymer chains have a composition 15 weight % or less different from said average ethylene composition.

56. The composition according to claim 54, wherein said intermolecular compositional dispersity of said copolymer (i) is such that 95 weight % of said copolymer chains have a composition 10 wt. % or less different from said average ethylene composition.

57. The composition according to claim 54, wherein said low crystallinity segment comprises from about 20 to 53 wt. % ethylene.

58. The composition according to claim 57, wherein said crystallizable segment comprises at least about 57 wt. % ethylene.

59. The composition according to claim 58, wherein said copolymer (i) is characterized by a weight-average molecular weight of from about 2,000 to about 12,000,000.

60. The composition according to claim 50, wherein low crystallinity segment of said (i) comprises from about 30 to 50 weight % ethylene.

61. The composition according to claim 57, wherein said copolymer (i) has a MWD characterized by at least one of a ratio of $\overline{M}_w/\overline{M}_n$ of less than about 1.5 and a ratio of $\overline{M}_z/\overline{M}_w$ of less than about 1.5.

62. The composition according to claim 61, wherein said copolymer (i) has a MWD characterized by at least one of a ratio of $\overline{M}_w/\overline{M}_n$ of less than about 1.25 and a ratio of $\overline{M}_z/\overline{M}_w$ of less than about 1.2.

63. The composition according to claim 62 wherein said intermolecular compositional dispersity of said copolymer (i) is such that 95 weight % of said copolymer chains have a composition 13 weight % or less different from said average ethylene composition.

64. The composition according to claim 54, wherein said copolymer (i) has a total minimum ethylene content of about 20% on a weight basis.

65. The composition according to claim 54, wherein said copolymer's (i) chain segment sequences are characterized by at least one of the structures:

$$M—T \qquad (I)$$

$$T^1—(M—T^2)_x \qquad (II)$$

$$T^1—(M^1—T^2)_y—M^2 \qquad (III)$$

wherein x and y are each integers of 1 to 3, M comprises said crystallizable segment, T comprises said low crystallinity segment, $M^1$ and $M^2$ are the same or different and each comprises an M segment, and $T^1$ and $T^2$ are the same or different and each comprises a T segment.

66. The composition according to claim 65, wherein said copolymer's (i) segment sequences are characterized by structure I.

67. The composition according to claim 65, wherein copolymer's (i) chain segment sequences are characterized by structure II.

68. The composition according to claim 65, wherein x is one.

69. The composition according to claim 65, wherein said copolymer (i) said $T^1$ and $T^2$ segments are of about the same weight-average molecular weight.

70. The composition according to claim 69, wherein in said copolymer (i) the sum of the weight average molecular weights of said $T^1$ and $T^2$ segments is about equal to the weight-average molecular weight of said M segment.

71. The composition according to claim 65, wherein copolymer (i) has a MWD characterized by at least one of a ratio of $\overline{M}_w/\overline{M}_n$ of less than about 1.5 and a ratio of $\overline{M}_z/\overline{M}_w$ of less than about 1.5.

72. The composition according to claim 71, wherein said copolymer (i) has a MWD characterized by at least one or a ratio of $\overline{M}_w/\overline{M}_n$ of less than about 1.25 and a ratio of $\overline{M}_z/\overline{M}_w$ of less than about 1.2.

73. The composition according to claim 72, wherein copolymer (i) has a MWD characterized by both a ratio of $\overline{M}_w/\overline{M}_n$ of less than about 1.25 and a ratio of $\overline{M}_z/\overline{M}_w$ of less than about 1.2.

74. The composition according to claim 54, wherein said copolymer (i) has a total ethylene of greater than about 35% on a weight basis.

75. The composition according to claim 54, wherein (ii) is selected from the group consisting of maleic acid and maleic anhydride.

76. The composition according to claim 75, wherein (ii) is maleic anhydride.

77. The composition according to claim 54 wherein polyamine (iii) is selected from p represented by the formulae

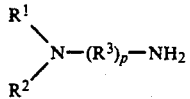

(I)

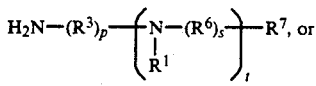

(II)

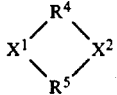

(III)

wherein:
p is zero or one;
s is zero or one;
t is 1 to about 10;
R¹ and R² are independently selected from alkyl radicals, either straight chain or branched, containing from 1 to about 6 carbon atoms and cycloalkyl radicals containing from 4 to about 8 ring carbon atoms;
R³ and R⁶ are independently selected from unsubstituted or $C_1$–$C_6$ alkyl substituted alkylene radicals having from 1 to about 6 carbon atoms;
R⁴ and R⁵ are independently selected from unsubstituted, $C_1$–$C_6$ alkyl substituted, or Y substituted alkylene radicals containing from 1 to about 6 carbon atoms, or from unsubstituted, $C_1$–$C_6$ alkyl substituted, or Y substituted alkenylene radicals containing from 2 to about 6 carbon atoms;
R⁷ is hydrogen, alkyl radical containing from 1 to about 6 carbons,

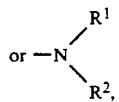

with the proviso that if s is zero R⁷ is not hydrogen;
X¹ and X² are independently selected from —O—, —S—, NR¹, R³, NY, or CHY radicals; and
Y is $NH_2$ or —R³—$NH_2$; with the proviso that the identities of groups X¹, X², R⁴ and R⁵ are selected to provide only one primary amine group and at least one tertiary amine per molecule of structural Formula III.

78. The composition according to claim 54, wherein ethylene copolymer (i) is grafted with ethylenically unsaturated carboxylic acid (ii) in a solvent in the presence of free radical grafting initiator.

79. The composition according to claim 78, wherein said solvent is mineral oil.

80. The composition according to claim 78, wherein (ii) is reacted with grafted ethylene copolymer (i) in said solvent.

81. The composition according to claim 78, wherein said solvent is a mineral oil.

82. The composition according to claim 54, wherein said composition is an oil concentrate.

83. An oil soluble composition of matter useful as a viscosity index modifier additive for lubricating oil compositions comprising (i) copolymer of ethylene and at least one other alpha-olefin monomer, said copolymer comprising intramolecularly heterogeneous copolymer chains containing at least one crystallizable segment of methylene units and at least one low crystallinity segment of methylene units and at least one low crystallinity ethylene-alpha-olefin copolymer segment, wherein said at least one crystallizable segment comprises at least about 10 weight percent of said copolymer chain and contains at least about 57 weight percent ethylene, wherein said low crystallinity segment contains not greater than about 53 weight percent ethylene, and wherein said copolymer has a molecular weight distribution characterized at least one of a ratio of $\overline{M}_w/\overline{M}_n$ of less than 2 and a ratio of $\overline{M}_z/\overline{M}_w$ of less than 1.8, and wherein at least two portions of an individual intramolecularly heterogeneous chain, each portion comprising at least 5 weight percent of said chain, differ in composition from one another by at least 7 weight percent ethylene; grafted with (ii) ethylenically unsaturated grafting material under grafting conditions effective to produce grafted ethylene copolymer having a molecular weight distribution which does not differ from the molecular weight distribution of said copolymer of ethylene by more than about 10%; said grafting material being selected from the group consisting of
(a) esters of unsaturated alcohols;
(b) esters of saturated alcohols with unsaturated acids;
(c) unsaturated ethers;
(d) unsaturated ketones;
(e) unsaturated, polar nitrogen-containing hydrocarbon compounds;
(f) unsaturated carboxylic acid materials;
(g) maleic acid or anhydride and one or more other monomers copolymerizable therewith;
(h) methacrylates and acrylates, both monomeric and polymeric; and
(i) oxygen- or sulfur-containing vinyl heterocyclic compounds; and mixtures thereof.

84. The composition according to claim 83 wherein said grafting conditions comprise solution grafting at temperatures below about 225° C.

85. The composition according to claim 84 wherein said solution grafting is carried out in the presence of free radical initiator.

86. The composition according to claim 83 wherein said ethylenically unsaturated grafting material comprises ethylenically monounsaturated carboxylic acid material containing from 1 to 2 carboxylic acid groups or anhydride group.

87. The composition according to claim 86 wherein said grafting material comprises ethylenically unsaturated carboxylic acid material comprising ethylenically unsaturated $C_3$ to $C_{10}$ monocarboxylic acid.

88. The composition according to claim 86 wherein said grafting material comprises ethylenically unsaturated carboxylic acid material comprising ethylenically monounsaturated $C_4$ to $C_{10}$ dicarboxylic acid or anhydride.

89. The composition according to claim 88 wherein said dicarboxylic acid or anhydride is selected from the group consisting of maleic acid, maleic anhydride, and mixtures thereof.

90. The composition according to claim 89 wherein said dicarboxylic acid or anhydride is m anhydride.

91. The composition according to claim 83 wherein intermolecular compositional dispersity of said copolymer of ethylene is such that 95 weight % of said copolymer chains have a composition 10 Wt. % or less different from said average ethylene composition.

92. The composition according to claim 91 wherein said low crystallinity segment comprises from about 20 to 53 wt. % ethylene.

93. The composition according to claim 92 wherein said crystallizable segment comprises at least about 57 wt. ethylene.

94. The composition according to claim 83 wherein said copolymer of ethylene has a MWD characterized by at least one of a ratio of $\overline{M}_w/\overline{M}_n$ of less than about 1.5 and a ratio of $\overline{M}_z/\overline{M}_w$ of less than about 1.5.

95. The composition according to claim 94 wherein said copolymer of ethylene has a MWD characterized by at least one of a ratio of $\overline{M}_w/\overline{M}_n$ of less than about 1.25 and a ratio of $\overline{M}_z/\overline{M}_w$ of less than about 1.2.

96. The composition according to claim 83 wherein said ethylene copolymer's chain segment sequences are characterized by at least one of the structures:

$$M-T \quad (I)$$

$$T^1-(M-T^2)_x \quad (II)$$

$$T^1-(M^1-T^2)_y-M^2 \quad (III)$$

wherein x and y are each integers of 1 to 3, M comprises said crystallizable segment, T comprises said low crystallinity segment, $M^1$ and $M^2$ are the same or different and each comprises an M segment, and $T^1$ and $T^2$ are the same or different and each comprises an M segment, and $T^1$ and $T^2$ are the same or different and each comprises a T segment.

97. The composition according to claim 96 wherein said ethylene copolymer's segment sequences are characterized by structure I.

98. The composition according to claim 96 wherein said ethylene copolymer's chain segment sequences are characterized by structure II.

99. The composition according to claim 98 wherein x is one.

100. The composition according to claim 99 wherein in said ethylene copolymer said $T^1$ and $T^2$ segments are of about the same weight-average molecular weight.

101. The composition according to claim 100 wherein in ethylene copolymer the sum of the weight average molecular weights of said $T^1$ and $T^2$ segments is about equal to the weight-average molecular weight of said M segment.

* * * * *